Aug. 24, 1965  E. E. BURFORD  3,202,087
METHOD AND APPARATUS FOR TYING BALES
Filed April 14, 1965  9 Sheets-Sheet 1
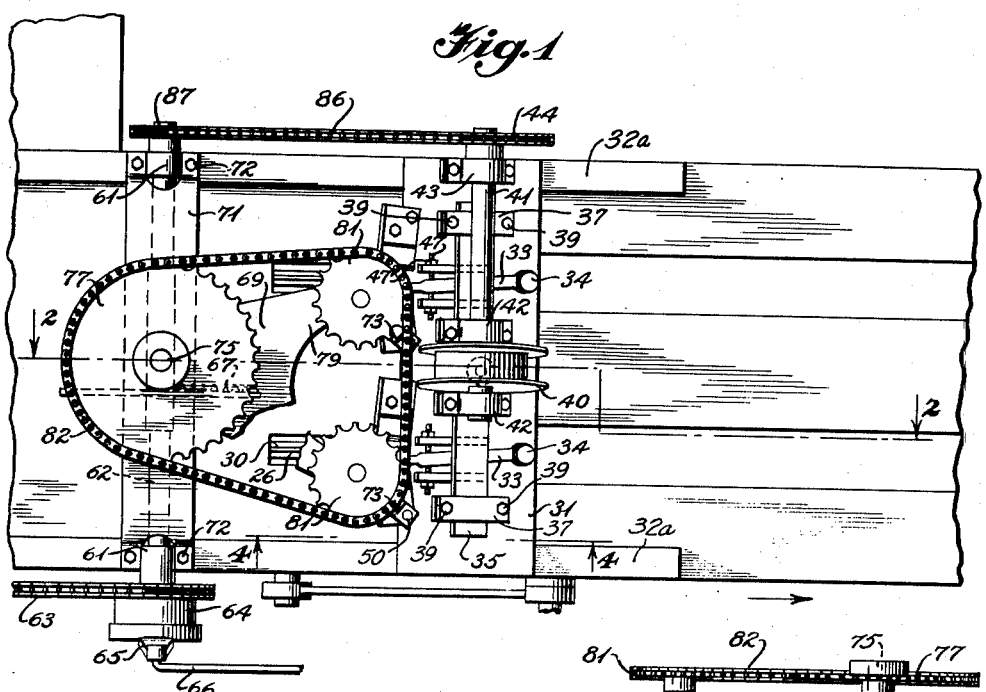
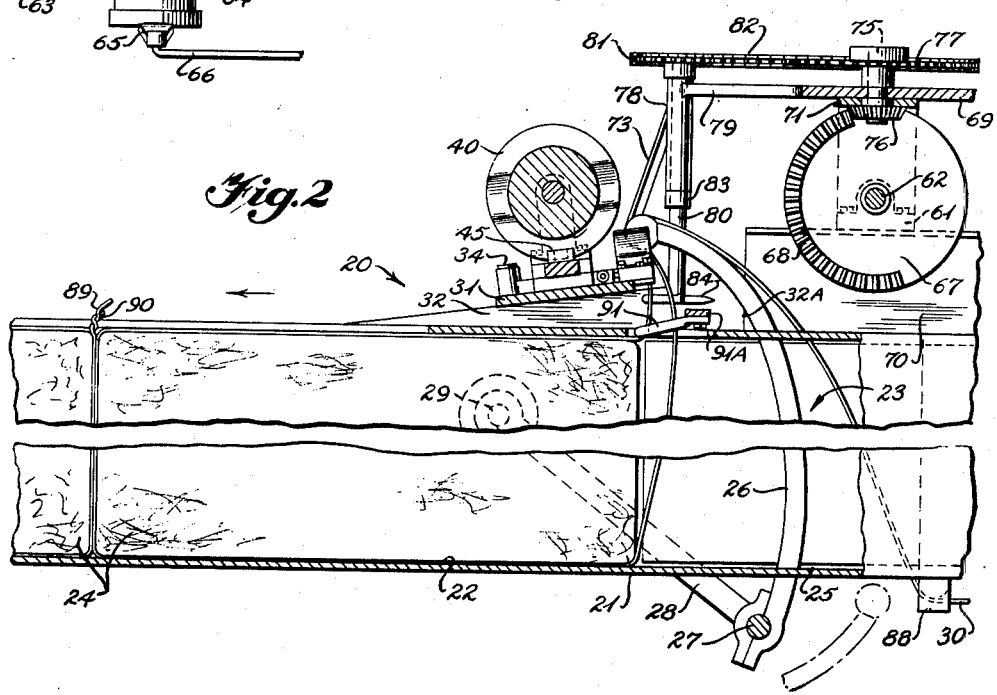
INVENTOR
*Earl E. Burford*
BY  A. Yates Dowell
ATTORNEY Aug. 24, 1965  E. E. BURFORD  3,202,087
METHOD AND APPARATUS FOR TYING BALES
Filed April 14, 1965  9 Sheets-Sheet 2

INVENTOR
Earl E. Burford
BY
A. Yates Dowell
ATTORNEY

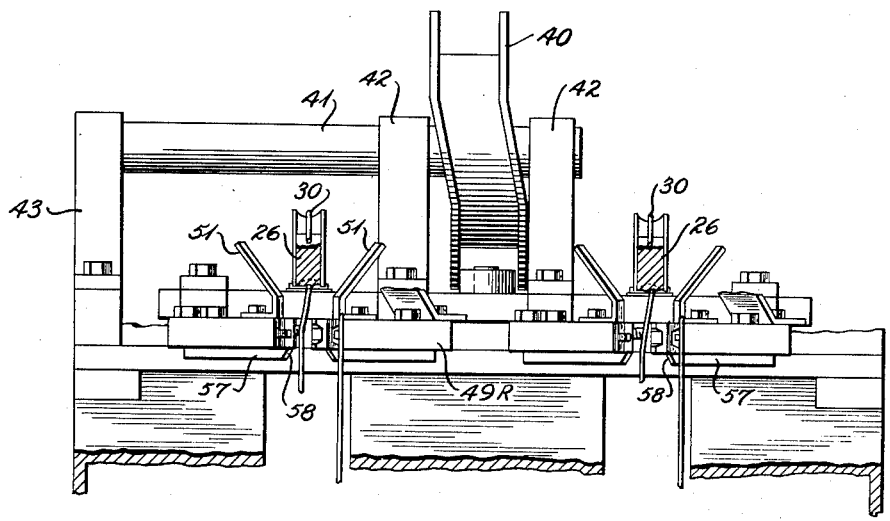
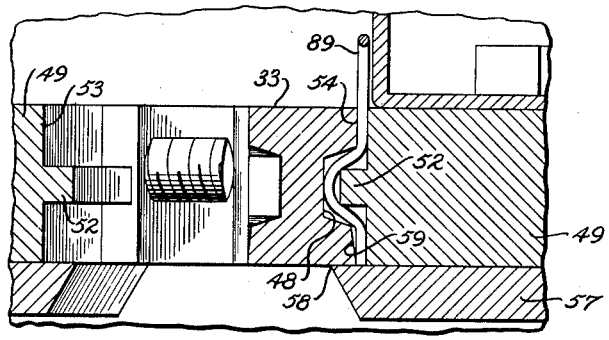
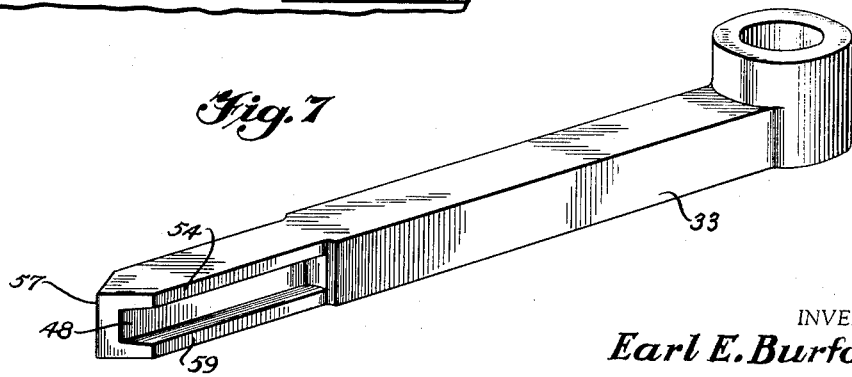
INVENTOR
Earl E. Burford
BY
ATTORNEY

INVENTOR
Earl E. Burford
BY A. Yates Dowell
ATTORNEY

Aug. 24, 1965   E. E. BURFORD   3,202,087
METHOD AND APPARATUS FOR TYING BALES
Filed April 14, 1965   9 Sheets-Sheet 5

INVENTOR
EARL E. BURFORD

BY
ATTORNEY

Aug. 24, 1965  E. E. BURFORD  3,202,087
METHOD AND APPARATUS FOR TYING BALES
Filed April 14, 1965  9 Sheets-Sheet 6

INVENTOR
EARL E. BURFORD
BY
ATTORNEY

Aug. 24, 1965
E. E. BURFORD
3,202,087
METHOD AND APPARATUS FOR TYING BALES
Filed April 14, 1965
9 Sheets-Sheet 7
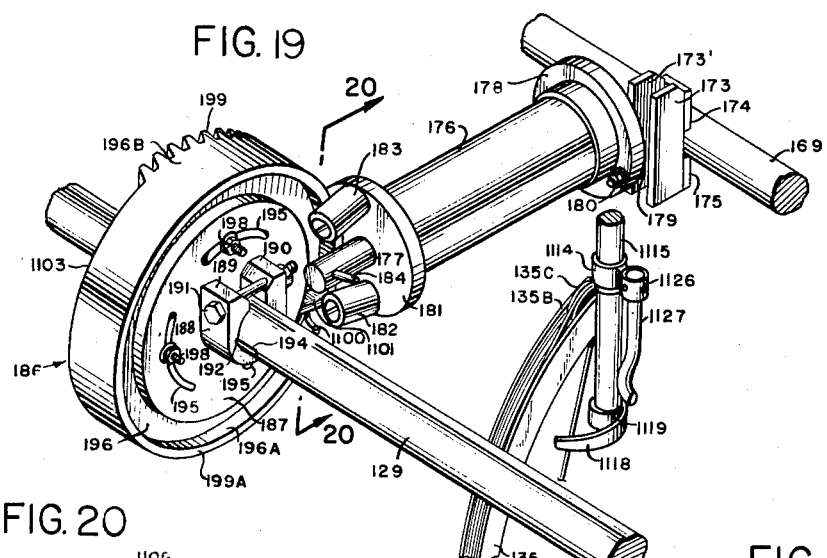
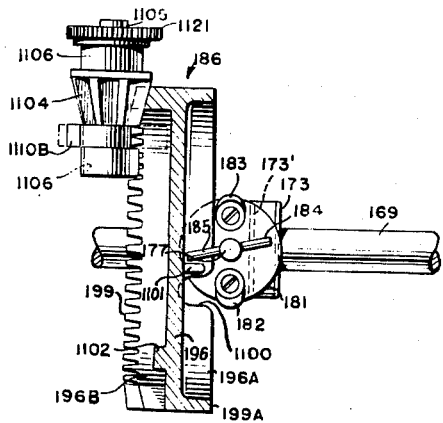
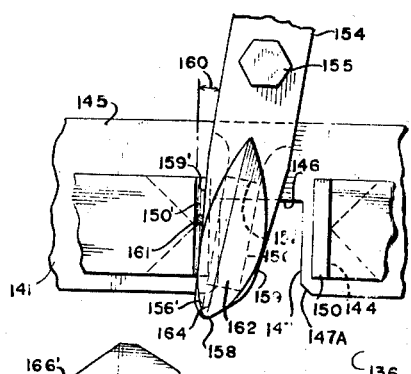
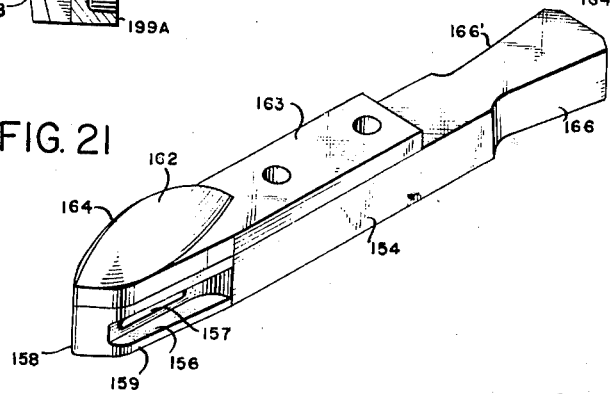
INVENTOR
EARL E. BURFORD
BY
*Hyatt Sewell*
ATTORNEY Aug. 24, 1965  E. E. BURFORD  3,202,087
METHOD AND APPARATUS FOR TYING BALES
Filed April 14, 1965  9 Sheets-Sheet 8
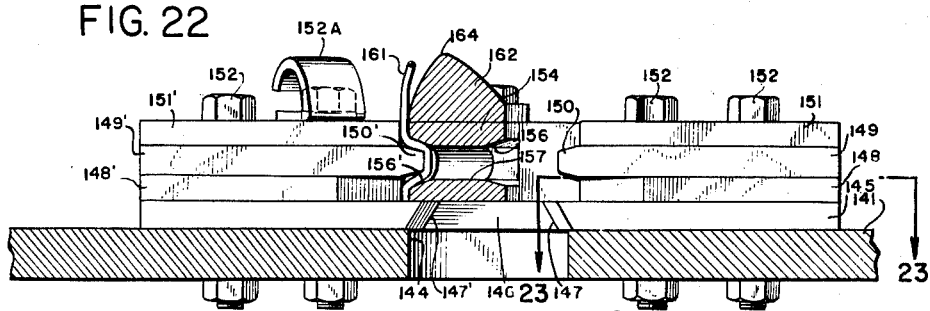
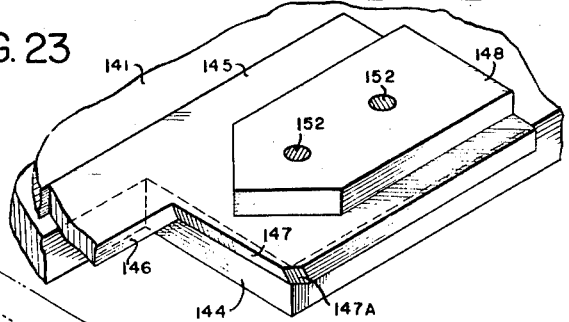
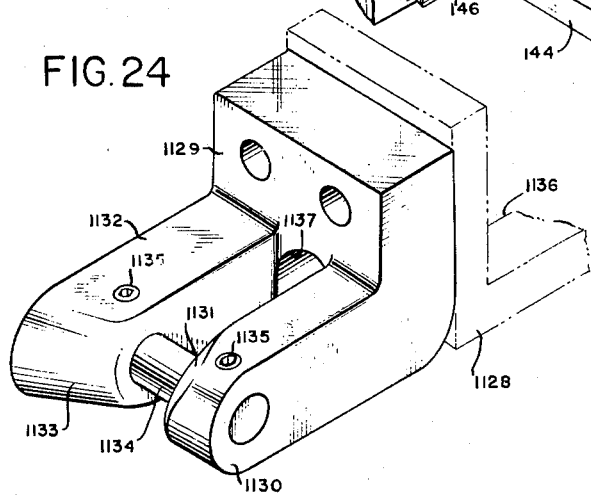
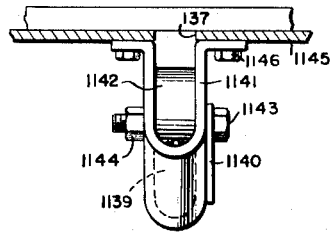
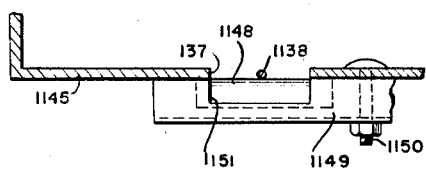
INVENTOR
EARL E. BURFORD
BY
ATTORNEY United States Patent Office 3,202,087
Patented Aug. 24, 1965

3,202,087
METHOD AND APPARATUS FOR TYING BALES
Earl E. Burford, Rte. 1, Maysville, Okla.
Filed Apr. 14, 1965, Ser. No. 449,686
32 Claims. (Cl. 100—3)

This application is a continuation-in-part of my prior copending application Serial No. 762,528, filed September 22, 1958, which in turn is a continuation-in-part of my earlier copending application Serial No. 753,444, filed August 6, 1958, now abandoned, Serial No. 551,586, filed December 7, 1955, now abandoned, and Serial No. 368,163, filed July 15, 1953, now abandoned, the disclosures of which are incorporated herein by reference in their entirety.

The present invention generally involves a method and apparatus for securing strand material and more particularly relates to a wire typing attachment for bale forming equipment or the like.

In order to properly understand and appreciate the basic contribution achieved by the present, a brief description of earlier baling practices must first be considered.

In Europe, as well as in the United States, the technique of baling during the first part of this century was crude as compared to present day standards of forming highly compressed bales. In reality, such bales were little more than a bundle of loosely gathered material as distinguished from the highly compacted bales formed under compression by present baling presses. Relatively little if any stress was imparted to the baling wire by a low density bale and therefore, there was no need to maintain control over the free ends of the strands during the tying operation. Thus, the strand could be severed from the wire supply prior to being twisted since the loosely gathered bale would not have any tendency to expand and cause the wire ends to separate before being secured. In contrast, a high density bale formed under considerable pressure in a modern bale press will impose a residual stress on the bale wire sufficient to either strip the free ends from the twisting hook before the tie has been secured or break the wire upon removal of the bale forming pressure when the tied bale is discharged from the bale press.

By relieving excessive tension prior to severing the strand from the wire supply, it was discovered that a highly compressed bale could expand without rupturing the tie. By partially securing the tie before severence of the strand, it was possible to retain control over the wire during the typing operation and guide the free ends of the strand into engagement with the twisting hook in order to prevent stripping of the wire before completion of the tie.

General objectives of this invention can be summarized as follows:

(1) Relieving wire tension prior to severing the strand from the wire supply.

(2) Partially securing the tie by twisting the gathered ends before severing the strand from the wire supply so as to retain control over the wire during the tying operation.

(3) Initiating the twisting operation while relieving tension on the wire prior to severing the strand from the wire supply.

(4) Deflecting the free ends of the wire during the twisting operation to prevent stripping of the wire from the twisting hook before completion of the tie.

(5) Oscillating the associated wire cutting and gripping finger through a drive mechanism which includes a reciprocating rod and cam drive means.

Thus, a basic feature of the present invention resides in providing a novel method and means for relieving residual stress on a bale wire during the tying operation while retaining control over the portion of wire being secured by allowing the wire to slacken while initiating the twisting operation before the strand is severed from the wire supply. Among other features, this invention also achieves the general objective of providing a simple and efficient wire tying attachment for hay baling equipment which may be operated with a minimum of power and readily installed without extensive modification. A further feature of the present invention is to provide deflector means to assist in applying a drag on the free ends of the bale wire to prevent stripping of the wire from the twisting hook.

Other and further objects will be apparent as the description proceeds and upon reference to the accompanying drawings wherein:

FIGURE 1 is a plan view of a portion of a baler with the wire gripping and twisting operating mechanism shown therein as constructed in accordance with one embodiment of the invention;

FIGURE 2 is a sectional view taken on the broken line 2—2 of FIGURE 1;

FIGURE 5 is a section taken substantially on the line 5—5 of FIGURE 3;

FIGURE 6 is a section taken on the line 6—6 of FIGURE 3;

FIGURE 7 is a perspective of the wire gripping finger as used in the apparatus of FIGURE 1;

FIGURE 19 is a fragmentary enlarged perspective of the combination mutilated gear cam and cam shaft operating mechanism, shown in FIGURE 17, for the wire gripping and severing means and illustrating the wire carrying needle and wire twister in operative position after the twister shaft has made one half revolution;

FIGURE 20 is a diagrammatic front view of the cam shaft taken generally on line 20—20 of FIGURE 19 showing the relation of the cam followers and the transverse pin at the instant that rotation of the cam shaft is begun;

FIGURE 21 is a perspective of one of the movable wire grippers of FIGURE 17 which also serves as a movable cutting element;

FIGURE 22 is a front elevation of the stationary abutments of FIGURE 17 and shows the pivoted gripper in section in its operative position retaining a wire against one abutment after having severed the wire;

FIGURE 23 is a fragmentary perspective section taken on line 23—23 of FIGURE 22 of a portion of a base plate with a stationary ledger blade and wedge shaped spacing element thereon;

FIGURE 24 is a perspective of a wire guiding fork mounted on an angle shown in phantom for retaining the wire in proper position to be caught by the twisting hook;

Figure 18:
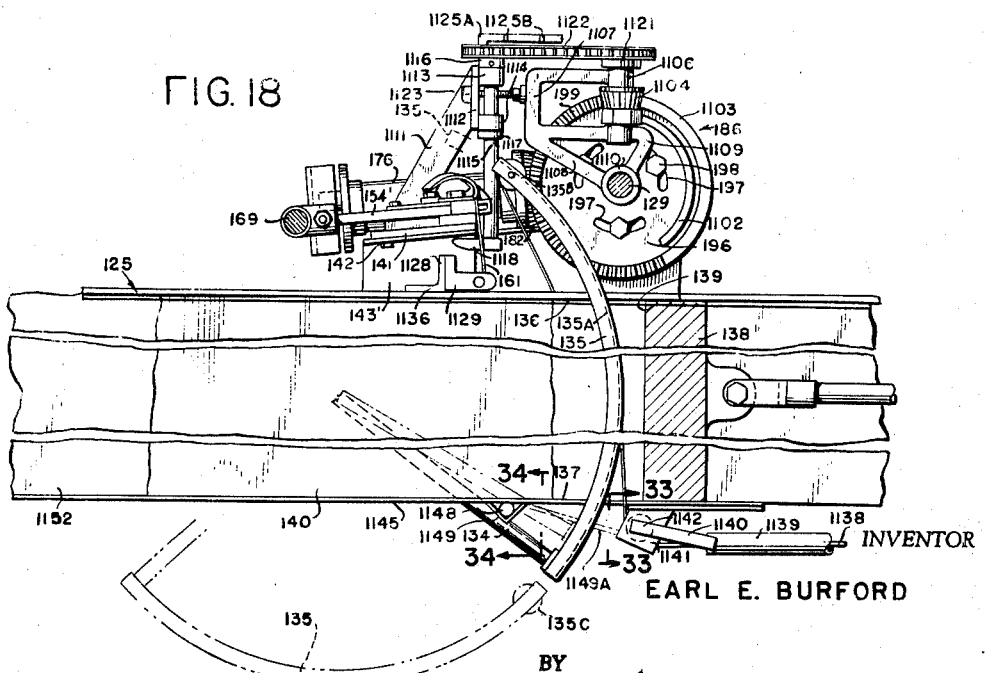
FIGURE 18 is a vertical section taken generally on line 18—18 of FIGURE 17, showing the wire carrying needles and the wire clamping and twisting attachments as well as the extreme extended and withdrawn positions of the needles in phantom outline.
Figure 25:
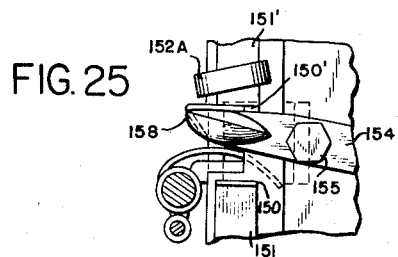
FIGURES 25 and 26 are a fragmentary plan and an elevation view, respectively, of the initial position of the movable gripper and of the twister hook prior to beginning of a cycle of operation, the needles being in the dash dot dot line position of FIGURE 18.
Figure 27:
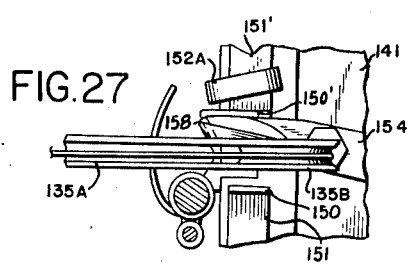
FIGURES 27 and 28 are a fragmentary plan and an elevational view respectively of the wire gripping means, the needle and the twisting hook at the time the needle is in its most advanced position in the apparatus of FIGURE 18.
Figure 26:
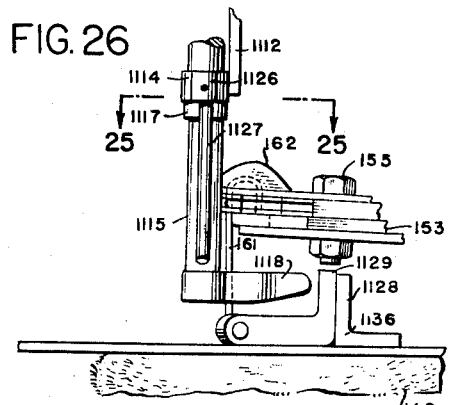
Figure 28:
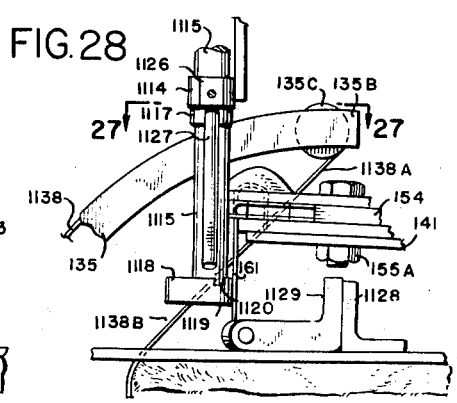
Figure 29:
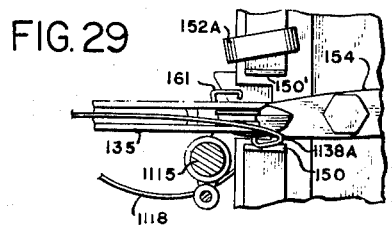
Figure 31:
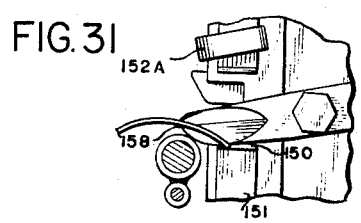
Figure 30:
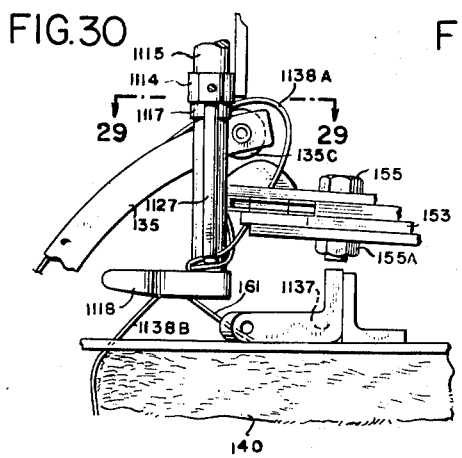
Figure 32:
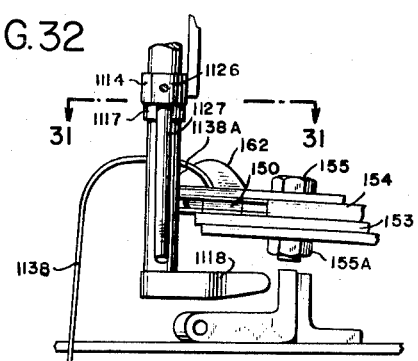

FIGURES 29 and 30 are a fragmentary plan and elevational view respectively of the needle after it is partially withdrawn from its extreme position of FIGURES 27 and 28, and the wire twisting hook has made approximately one and one-half turns from its initial position and has engaged the wire surrounding the bale as well as the wire from the needle, the wire from the needle being about to be severed at this instant;

FIGURES 31 and 32 are a fragmentary plan and elevational view respectively of the gripping bar and the rotary hook after the completion of twisting cycle shown in FIGURES 25 to 30 inclusive;

FIGURE 33 is a fragmentary section taken on line 33—33 of FIGURE 18 showing a wire supply guide;

FIGURE 34 is a fragmentary section taken on line 34—34 of FIGURE 18 showing a guide for cooperation with the wire supply guide of FIGURE 33 to maintain the wire in proper position for engagement by the needle in the wire inserting process; and FIGURE 35 is an enlarged fragmentary plan view of the pivoted gripper and the stationary abutments of FIGURE 22 showing the tapering space therebetween for retaining the wire against forward withdrawal.

Figure 12:
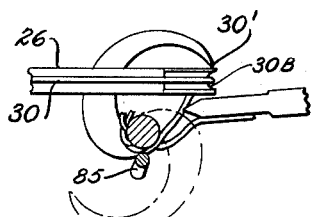
FIGURE 12 is a plan view approximately on line 12—12 of FIGURE 8 illustrating movement of the twister as well as wire gripping finger just prior to the release of one wire.
Figure 13:
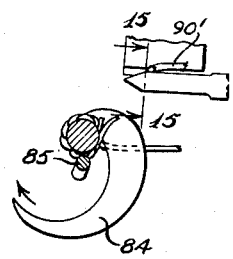
FIGURE 13 is a plan view on line 13—13 of FIGURE 11 showing the gripping and severing of the wire from the needle with the needle omitted for clarity.
Figure 14:
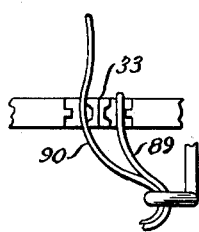
FIGURE 14 is a transverse section of the wire gripping finger and abutments with parts omitted taken substantially on line 14—14 of FIGURE 9 at the time one wire end is released and the wire from the needle is about to be gripped and severed.
Figure 15:
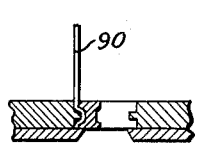
FIGURE 15 is a section taken substantially on line 15—15 of FIGURE 13, illustrating the release of the gripped end and the gripping of the wire from the needle and the severing of the needle wire.

Referring to the drawings and particularly to FIGURES 1–15, a portion of a conventional baler 20 includes an elongated casing 21 having a bale forming chamber 22, in which a conventional type plunger 23 is reciprocated to compress the hay or other material into the form of a bale 24 against the end of a previously formed bale. The plunger 23 is provided with needle receiving slots 25 through which arcuately shaped needles 26 oscillate. Needles 26 are carried by bar 27 mounted on the ends of rock arms 28 pivoted at 29 on the casing 21 or suitable frame structure and the needles oscillate from the dotted line position as shown in FIGURE 2 and slightly beyond the full line position for feeding an intermediate portion of a wire 30 to the wire gripping and twisting mechanism. The end 30′ of each needle is made of hardened steel with a groove 30B therearound for guiding the wire in the manner shown in FIGURE 12.

The wire gripping and twisting mechanism comprises an elongated supporting plate 31 extending transversely of the baler and secured at its ends by means of bolts or the like at an inclination on tapered portions 32 of sills 32A which may have rearwardly extending portions 70, as shown in FIGURE 2, upon which operating mechanism hereinafter described may be mounted. The forward direction is indicated by the arrows in FIGURE 2 and is assumed to be the direction of feed of the bales. Rearwardly extending wire gripping fingers 33 are mounted on plate 31 for oscillation about pivots 34 projecting upwardly from the plate 31 adjacent the forward edge thereof. Since the wire gripping fingers, the cooperating needle, abutments and wire twisting mechanism are duplicated for each wire applied to the bale, only one unit will be described in detail and it will be understood that the other or others operate in substantially the same manner.

An elongated bar 35 (FIGURES 1 to 4 inclusive) is mounted for sliding transverse movement on plate 31 above the wire gripping fingers 33 between bearing plates 36 and 37 spaced apart by spacers 38, 38 and secured to the transverse plate 31 by bolts 39, 39. A drum-shaped cam 40 is fixed on a shaft 41 which is rotatably mounted in thrust bearings 42, 42 supported on pedestals above plate 31 on each side of the drum cam and a bearing 43 supported on a pedestal at the left edge of the baler. A sprocket 44 fixed to the left end of shaft 41 serves to rotate the shaft in timed relation by mechanism hereinafter described.

A cam follower 45 is rotatably mounted on the sliding bar 35 and engages and rides in the groove of cam drum 40 to produce reciprocatory movement of the bar 35 upon rotation of cam 40. Projecting forwardly and fixed to the underside of the bar 35 by welding or the like are short bars providing lugs 46, 46 through the rear ends of which adjusting screws 47, 47 are threaded and secured in adjusted position by suitable locking nuts 47′. The inner ends of the adjusting screws engage the sides of wire gripping fingers 33 to produce oscillatory motion thereof when the bar 35 is reciprocated.

Figure 3:
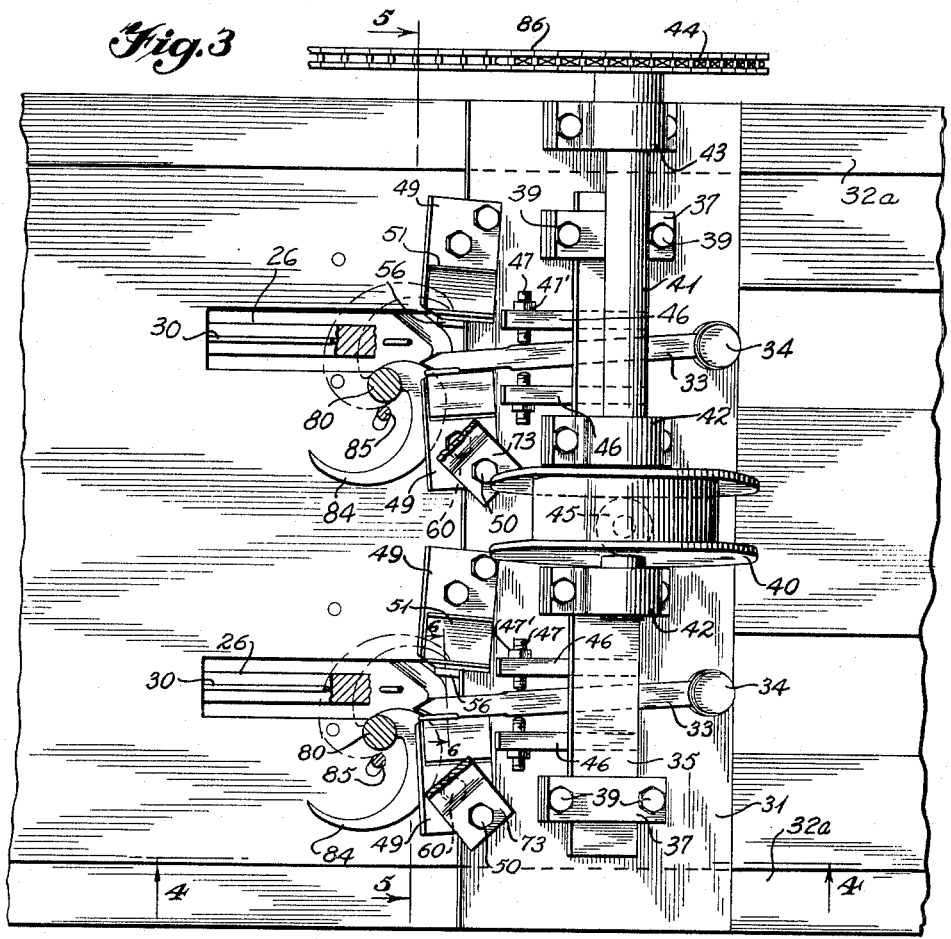
FIGURE 3 is a plan view similar to FIGURE 1 on an enlarged scale with some parts in section showing the relation between the wire gripping and twisting mechanism and taken substantially on the broken line 3—3 of FIGURE 4.

The free or rear end portion of the wire gripping fingers 33 (FIGS. 5 to 7) is wedgeshaped as shown at 57 (FIGURE 7) and provided with lateral grooves 48 for receiving the wire 30. Fixed to the rear edge of the supporting plate 31 are abutment plates 49 which project beyond the edge of the supporting plate and are secured thereto by cap screws 50 passing through the abutment and threaded into the supporting plate and such cap screws may also retain guides 51, 51 which have portions diverging upwardly and rearwardly as shown in FIGURES 3 and 5. Each abutment plate 49 includes a tongue 52 which is received in the corresponding groove 48 of the wire gripping finger 33 when the finger is moved to wire gripping relation as shown in FIGURE 6. It will be evident that the cam 40 is provided with sufficient displacement to move the follower 45 and the bar 35 a sufficient distance to produce excess movement of the free end of the gripping finger 33. The adjusting screws 47 are properly adjusted to produce the desired gripping action by providing the necessary lost motion to prevent excessive strain on the mechanism and to obtain the proper gripping relation.

The wire contacting surface 53 of the abutments 49 and the cooperating surfaces 54, and 59 of the gripping finger are so arranged that the wire may be gripped over a substantial portion thereof along the length of the cooperating portions of the wire gripping finger and abutments. The wire is bent in a zig-zag fashion as shown in FIGURE 6 by the gripping finger and abutments thereby avoiding high gripping pressures. Each abutment plate may be made from a number of flat bars providing a laminated structure to reduce machining expense.

The rear portions of the abutment plates 49 are cut off or beveled at 56 to produce a rearwardly flaring entrance opening for the lateral insertion of wire. The wedge-shaped end 57 of the finger cooperates with the beveled portion 56 of either abutment to facilitate the insertion of the wire 30 fed by the needle 26.

Fixed to the bottom of the abutment plates 49 are cutters 57 provided with a beveled cutting edge 58 for cooperation with the surface 59 which also provides a cooperating beveled edge on the finger 33 thereby producing a shearing action upon transverse motion of the finger 33 relative to the cooperating abutment 49. The shearing blade may be mounted in any suitable manner for adjustment to take care of wear and the normal sharpening of the blade. Such means may include one or more cap screws 60 extending through a slot in the abutment plate and threaded into the cutter so as to maintain a substantially smooth surface at the bottom of the cutter blade.

As shown in FIGURE 2, a rearwardly extending portion 70 of each sill 32A is supported along the upper surface of the casing 21 and carries a bearing 61 in which a shaft 62 is rotatably mounted. The shaft 62 is rotated for one revolution by means of a chain 63 supplying power from a suitable source to a one revolution clutch 64 which is actuated by a lever 65 to which link 66 is connected. Such link 66 may be operated by suitable timing mechanism (not shown) or by hand.

Fixed on shaft 62 is a mutilated beveled gear 67 having teeth 68 on approximately half the circumference thereof. A twister supporting frame or spider 69 is maintained above the portion 70 of the sills 32A by suitable means which may include an arched support 71 extending between bearings 61 and spider 69 and secured to said bearings and spider by any suitable means which may include welding thereby fixing the spider with relation to the bearing 61 for maintaining the parts in operating relation. If desired bolts 72 which retain the bearings 61 on sills 32A may pass through the ends of the arched support 71 for additionally maintaining the parts in operative relation. Rotatably mounted in a suitable bearing on the support is a stub shaft 75 having a beveled gear 76 fixed to the lower end thereof and having a driving sprocket wheel 77 fixed to the upper end. An elongated bearing 78 is fixed to each of the forwardly extending arms 79 and a twister shaft 80 is rotatably mounted in the bearings 78. In FIGURE 1 part of the right spider arm 79 is broken away to expose the needle 26. A sprocket wheel 81 is fixed to the upper end of each twister shaft 80 and a chain 82 passes around each sprocket 81 and the driving sprocket 77 to maintain a proper timed relationship for rotating the twister shafts 80. A collar 83 secured by a flush screw or the like maintains the twister shaft 80 in proper vertical position.

The spider 69 may be additionally supported by means of braces 73 extending from elongated bearings 78 to the suporting plate 31 and may be removably secured to the supporting plate 31 by suitable fasteners such as cap screws 50 which also serve to secure the right wire-gripping abutments in position. Obviously entirely independent fasteners may be used and the braces 73 will be so positioned as not to interfere with the various parts. It will be evident that the twister mechanism may be readily detached from the gripping and severing mechanism when desired.

Removably mounted at the bottom of each twister shaft 80 is a twisting hook 84 which is keyed to the twister shaft 80 by suitable means such as a tongue on the lower end of the twister shaft engaging a groove in the upper portion of the hub of the twister hook 84 and an axially extending screw may secure said hook to the shaft. It will be obvious that the axis of the twister shaft 80 extends substantially perpendicularly and is offset to one side (the right) of the plane of the needle 26 and the wire 30 carried thereby. Positioned to the right of each hook when facing in the forward direction is a rod 58 fixed at its upper end to the bearing 78 by welding or the like and having its lower end diverging slightly from the shaft 80 and terminating at a distance from the upper surface of the hook 84 for engaging the wire ends to assist in the twisting operation. The deflector shaft causes the loose or cut ends of the wire to wrap around the twister shaft so as to prevent the wire from leaving the twister hook.

The sprocket 44 on shaft 41 is driven by means of a chain 86 which passes over a sprocket 87 fixed to the shaft 62 as well as sprocket 44. The ratio of the sprocket 87 to the sprocket 44 is one to two so that the shaft 62 must make two complete revolutions for one complete revolution of the shaft 41.

Operation of the baler

Figure 4:
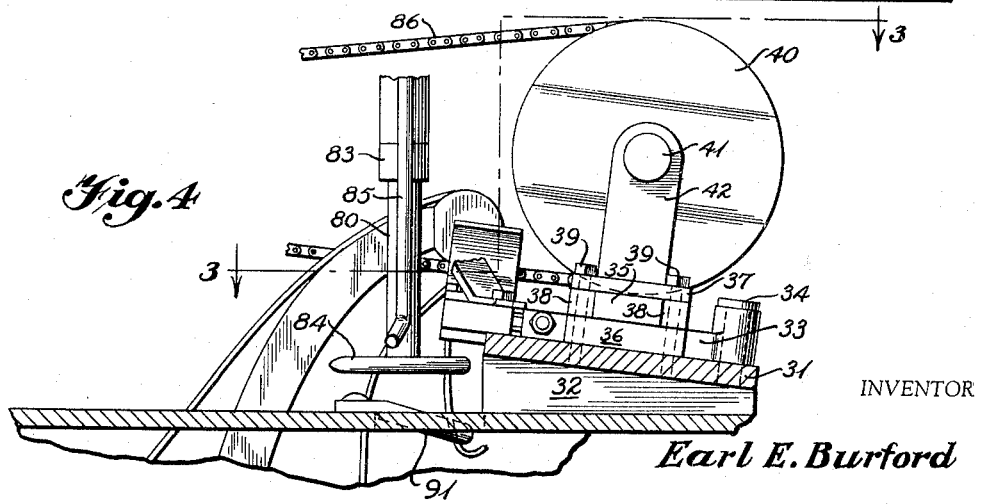
FIGURE 4 is a section on line 4—4 of FIGURE 3 illustrating one of the gripping devices and the cooperating wire twister.
Figure 8:
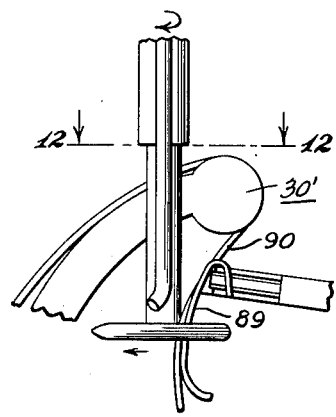
FIGURES 8, 9, 10 and 11 are right side elevations of different stages of the wire feeding, gripping and twisting operation performed with the apparatus of FIGURE 1, the abutments being omitted for clarity.
Figure 9:
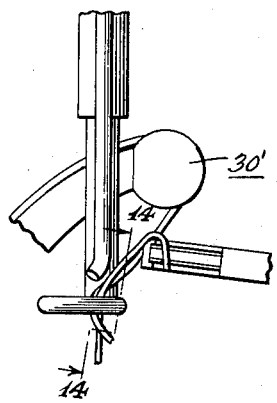
Figure 10:
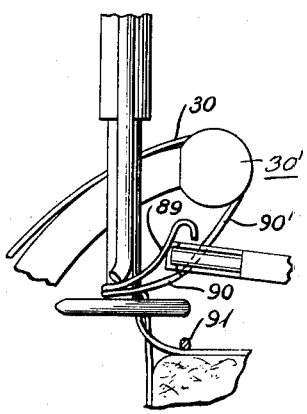
Figure 11:
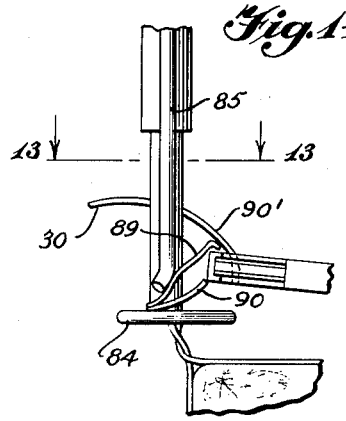

Assuming that a bale 24 has been previously formed, the wire 30 will be gripped by the finger 33 and one of the abutment plates 49 shown to be the right hand abutment in FIGS. 5 and 6 and the needle will be entirely below the bale forming chamber 21 in the dotted line position of FIG. 2 with the wire 30 passing vertically across the baling chamber 22. As plunger 23 reciprocates by conventional means (not shown) and hay is fed into the baling chamber 22 ahead of the plunger the plunger 23 forces such hay against the wire 30 extending vertically across the bale chamber 22 and such wire is pushed forwardly as more and more hay is pressed thereagainst by the periodic reciprocation and wire is drawn from the supply through guide 88 as needed and slides around the forward end of the bale. After a predetermined amount of hay has been fed, the plunger 23 may be stopped in the forward position shown to maintain the bale being formed in its final shape. The needles 26 are passed through the baling chamber 22 and through the needle receiving slots 25 of the plunger 23 and carry the wires 30 upwardly across the rear end of the compressed bale to the elevated position shown in FIG. 2 and slightly therebeyond so that the portion of wire extending from the needle behind the bale passes between the finger 33 and the unused abutment plate 49. The needle remains in elevated position for a sufficient time to permit the point of the twister 84 to embrace the wire extending from the needle across the bale as well as the wire end which is gripped between finger 33 and the right abutment plate 49R as shown in FIGURE 5. Upon continued rotation of the twister hook 84 both wires are brought together while finger 33 is moved to release the free end 89 of the wire extending around the bale and engage the wire extending from the needle. As the finger engages and grips the upper wire section 90′, it cuts wire section 90 below gripper finger 33 so that upon continued rotation of the twisting hook the released and cut wire ends 89 and 90 are free and are twisted by contact with rod 85 in a clockwise direction as viewed from above to form a twisted connection as shown in FIG. 2. A wire guide 91 of generally V shape serves to maintain the wire sections 90 and 89 in proper position for engagement by the twisting hook 84. The V-shaped guides 91 may be supported on the top wall of the bale forming chamber by bolts as shown in FIGURE 4 or may be supported from the sills 32A by means of a discontinuous cross member 91A (see FIGURE 2) which extends from the adjacent sill to the V-shaped guide 91 and between the V-shaped guides 91 and then to the other sill member thereby making the complete tier a separate unit attachable to existing balers with a minimum of adjustment after attachment.

The wire extending to the needle having been gripped, the needle is withdrawn to its dotted line position shown in FIGURE 2 and another bale is formed in substantially the same manner and the securing of the ends 89 and 90 of the wire repeated but on the other side of the gripping finger 33 as will be obvious.

Of course, further variations may be made to the embodiment of the invention described thus far, and the same is true of the apparatus described in the following embodiment of this invention.

Briefly stated, the embodiment of FIGURES 16–35 is similar to that of FIGURES 1–15 and includes a base plate having wire receiving recesses on the forward edge with stationary gripper abutments on opposite sides of the recesses, said recesses and abutments being arranged for registry with the needle and wire passages in a baler. A pivoted gripper cutter mounted on the base plate cooperates with each pair of gripper abutments to cut and clamp wires on the opposite sides of the pivoted gripper cutter upon successive formation of bales.

Suitable wire guides retain the wires from the needles in proper relation to crescent shaped twisters and to the gripper devices, with the wire remaining in position partly by its stiffness while the twister engages the wire end from the bale as well as the wire from the needle, and after proper engagement corresponding to 1½ turns of the twister, the wire from the bale is released from the clamping action of one side of the pivoted gripper cutter and the wire from the needle is severed while the remaining portion is clamped between the other side of the pivoted gripper; the twister making a sufficient number of turns to permanently secure the free wire ends together around the formed bale which is thereafter discharged.

Referring more particularly to the drawings as in the previous embodiment, identical items in the machine are identified by the same reference numerals but in some instances the items on the right are distinguished from the same item on the left by the addition of a prime mark ('). A conventional hay baler shown in FIGURE 16 as mounted on wheels is provided with a hay baling chamber 125 in which hay is compressed by a ram or plunger 138 driven from a conventional source of power such as a motor 126 that also provides power through a chain 127 to sprocket 128 connected with knotter shaft 129 which is rotatably mounted in bearings 129A, 129A mounted on the sides of the bay baler. The sprocket 128 is positively connected to the knotter shaft 129 by means of a one-revolution clutch 130 which is designed to give the knotter shaft one complete revolution and to stop the knotter shaft in a definite position.

Affixed to the knotter shaft are cranks 131, 131 and related crank arms pivotally connected to one end of pitmen 132, 132 which in turn are connected at their outer ends to arms 133, 133 fixed on a pivotally mounted needle supporting yoke 134 on which arcuate shaped needles 135, 135 are fixed for passage through the hay baling chamber to carry the bailing wires across the ends of the hay bale being formed as is the case with needles 26. Each needle 135 may be of the conventional twine carrying type having the usual guiding groove 135A formed along the outer convex surface. To the free end of each needle 135 a fork 135B is secured by welding, with a grooved roller 135C being rotatably mounted in the fork on anti-friction bearings inwardly from the free ends of the tines; each tine having its inner surface flaring outwardly to assist in guiding the wire 113B into the grooved roller 135C.

The clutch 130 is actuated by automatic means when sufficient hay has been compressed in the baling chamber to form a full size bale and since this structure is well known in the art and is described above, no specific reference is made thereto at this point.

The hay baling chamber 125 is provided with slots 136, 136' in the top wall of the baling chamber, and registering slots 137, 137 in the bottom wall of the baling chamber for the passage of needles 135, 135 just as plunger 22 (FIGURE 2) has needle receiving slots. The usual reciprocating ram or plunger 138 engages the loose hay and forces such loose hay into the bale forming portion of the chamber 125 against the forward end of a previously completed bale, the ram or plunger 138 being reciprocated by suitable power means as is plunger 23. The plunger 138 is provided with needle receiving slots 139, 139, open at the top, bottom and rear so that the plunger 138 may be pressed tightly against the end of a bale 140 being formed in the baling chamber to maintain a compressed condition of the hay while the wire is being secured around such bale.

To a conventional baler such as that described above, the strand securing machine of the present invention is applied, such machine base plate 141 comprising an elongated planar member mounted by means of bolts 142, upon brackets or sills 143, 143 fixed to the opposite sides of the hay baling chamber 125 in any suitable manner, the base plate 141 being inclined as shown toward knotter shaft 129. It is apparent that this construction is similar to that associated with plate 31 referred to above.

The base plate 141 is provided with a pair of wire receiving slots 144, 144 extending from the front edge rearwardly a limited amount. The needle receiving slots 144, 144 in the base plate 141 are in registry with the needle receiving slots 136, 136' and 137, 137 of the baling chamber. A U-shaped stationary ledger bar 145 having a slot 146 cut inwardly from the front edge is mounted on the base plate 141 in registry with each slot 144, 144 in the latter. The sides of the slots 146, 146 provide bevelled edges 147, 147' with the corners 147A, 147A being cut away to provide a flaring mouth. This mouth corresponds to that provided by plates 57 having beveled edges 58. Upon the ledger bars 145, 145 a pair of boat shaped spacers 148, 148' are mounted and upon such boat shaped spacers stationary abutment gripper members 149, 149' are mounted, such stationary grippers having tongues 150, 150' respectively of trapezoidal cross-section and mounted on such stationary grippers are clamping plates 151, 151'. Each ledged blade 145, its boat shaped spacers 148, 148', stationary grippers 149, 149' and clamping plates 151, 151', and the base plate 141 are provided with aligned apertures through which bolts 152 pass and secure the parts together.

A wire bight guide 152A of C-shape is secured by the bolt 152 passing through an aperture in its lower portion to the upper surface of each clamping plate 151, 151' for maintaining control of the wire during the withdrawal of the needles 135, 135.

Rearwardly of the ledger blades and of equal thickness thereto spacer plates 153, 153 are mounted on the base plate 141 and upon such spacer plates movable gripper levers 154, 154 are pivotally mounted intermediate their ends on bolts 155, 15 threaded into the base plate and locked in position by lock nuts 155A.

The forward end of each gripper lever 154 is provided with trapezoidal shaped grooves 156, 156' for cooperation with trapezoidal shaped tongues 150, 150' of the stationary grippers. A passage 157 extends through the gripper from groove 156 to groove 156' to prevent the accumulation of hay in the grooves, the length of such passage being sufficient to allow tongues 150 or 150' to be received therein. It is apparent that this construction is similar to that of fingers 33 and the associated abutments, except for passage 157. The tip end 158 of the lever 154 is roundingly pointed with the extreme tip to the right of center as shown in FIGURE 35, the side edges 159, 159' of the movable gripper tappering toward the front end for cooperation with the inner edges of the trapezoidal shaped tongues 150, 150' of the stationary grippers and clamping plates 151, 151' to provide a tapered angular space measured by the angle 160 (see FIGURE 35) for more securely retaining a wire end 161 against forward withdrawal from the gripping action between each movable gripper 154 and the cooperating tongues 150, 150' and clamping plates 151, 151', such wire end extending to the upper surface of the next bale. The angularity of the surface 159 and 159' is the same on both sides of the movable gripper member so that a wire may be gripped on either side against the corresponding stationary abutment with equal facility, as with the embodiment of FIGURES 1–15.

A guide in the form of a rooster comb 162 may be cast integrally with an attaching plate 163 and has its ridge 164 extending from the tip 158 of the movable gripper 154 which tip is appreciably off center to the right of the axis of the movable gripper as shown in FIGURE 35 with such ridge extending rearwardly along the movable gripper lever 154, said rooster comb guide 162 being generally convex in both directions. Although the guide 162 may be welded to the gripper lever 154, it may be attached by having the pivot bolt 155 extend therethrough and an additional bolt 165 pass through the attaching plate 163 and be threaded into a threaded aperture in the gripper lever 154.

A portion adjacent the rear end of each movable gripper lever is cut away to provide rearwardly flaring edges 166, 166' for cooperation with threaded studs 167, 167' which are adjustably mounted in threaded apertures in lugs 168, 168' to provide for adjustment of the studs, the studs being held in adjusted position by lock nuts 168A. The movement of the gripper levers 154, 154 is the same as movement of the fingers 33 of FIGURE 1, however, the movement is accomplished by slightly different mechanical means as will appear hereinafter.

The lugs 168, 168' are fixed on a shuttle bar 169 which is slidably mounted on sleeves 170, 170 fixed to rearwardly extending straps 171, 171 mounted on the upper surface of the base plate 141 by bolts 172. It will be evident that as the shuttle bar 169 slides in sleeves 170, 170 the studs 167, 167' alternately engage the surfaces 166, 166' of each gripper lever 154 causing the gripping surfaces 159 or 159' to grip the wire 161 alternately against the tongues 150', 150 and clamping plates 151', 151 respectively.

Upon the shuttle bar 169 is a cross head formed of transversely positioned spaced parallel straps 173, 173' and braced by blocks 174, 175 welded to the bar 169 and to the straps thereby integrally securing the cross head to the shuttle bar. A sleeve 176 extending across the base plate 141 and rotatably supporting a central actuating shaft 177 is fixed to the base plate by welding or the like. A cam disc 178 fixed to the rear end of cam shaft 177 has its front surface engageable with straps 173, 173' of the cross head to prevent the shuttle bar 169 from rotating while permitting axial movement. A cam follower roller 179 secured to the rear face of the disc 178 by a nut 180 threaded onto the stub shaft of the cam roller 179 operates in the groove formed by plates 173, 173' of the cross head so that rotation of the cam shaft 177 will cause axial oscillation of the shuttle bar 169.

Fixed upon the forward end of the actuating shaft 177 (FIGS. 19 and 20) is a second disc 181 of concave shape having a pair of cam follower rollers 182, 183 mounted thereon in diametrically opposed relation by means of nuts threaded onto the stub shafts of the cam follower rollers. Extending transversely through the forwardly projecting end of the actuating shaft 177 and fixed thereto in acute angular relation to the imaginary line between rollers 182, 183 is a pin having projecting ends 184, 185 for positively causing initial movement of the cam shaft.

To operate the actuating shaft 177 a combination mutilated gear and cam 186 is mounted upon the knotter shaft 129 by means of a face plate 187 having an integral hub portion 188, said hub being split to provide relatively movable legs 189 and 190 which are drawn together by a bolt 191 so that the hub 188 may be tightly secured to the shaft 129 to prevent axial movement, the hub being provided with a key receiving slot 192 cooperating with the usual keyway 194 in the knotter shaft 129 to prevent relative rotation between the hub and shaft, the hub 188 being of sufficient length to overlie the keyway of the knotter shaft in all conventional types of balers so that the face plate 187 and hub 188 may be secured in proper position on previously manufactured balers without requiring expensive machining, the face plate 187 being provided with three arcuate slots 195.

The combination mutilated gear and cam 186 includes a web 196 having an aperture through the center thereof to receive the knotter shaft 129 and a continuous circular rim having portions 196A and 196B projecting from opposite sides of sub web. The web 196 is provided with three arcuate slots 197, adapted to register with slots 195, of the face plate, for the reception of bolts 198 to maintain the face plate and the combination mutilated gear and cam in fixed relation, such slots 197, and 195, being of sufficient length to provide for 360° of adjustment between the face plate 187 fixed to the shaft 129 and the mutilated gear and cam 186, thereby making it possible to use the present embodiment of the invention on practically all balers.

Gear teeth 199 are provided on the thickened right side rim portion 196B of the mutilated gear 186 and a cam surface 199A is provided on the left side, the cam surface 199A having a follower receiving notch 1100 adapted to receive cam followers 182 or 183 for rotating actuating shaft 177 one-half turn at a time. A lug 1101 fixed to the rim portion 196A and to the web 196 in advance of the notch 1100 engages the pin ends 184 or 185 on the actuating shaft 177 to initiate rotation of the actuating shaft as the mutilated gear and cam 186 are rotated. In FIGURE 20 the lug 1101 is shown at the instant of engagement of lug 1101 with the pin end 185 and the notch 1100 is about to receive the follower roller 182 as the mutilated gear 186 continues its rotation whereby actuating shaft 177 will be rotated by the follower 182 being positively moved as it is received in the notch 1100 until the follower 182 occupies the position of the follower 183 and the pin section 184 occupies the position formerly occupied by pin section 185 and the actuating shaft changes the position of cam follower 179 from the position shown to a position 180° therefrom in which the bar 169 is moved from the full line position shown in FIGURES 17 and 19 on the left to the dotted line position (FIGURE 17) on the right.

Gear teeth 199 are provided over a major segment of rim portion 196B and an arcuate flange 1102 is provided over a minor segment of the web 196 concentrically with the rim of the mutilated gear and cam 186 providing a cam dwell, a minor segment of rim portion 196B of the same arcuate extent as flange 1102 being cut away or omitted in the casting operation to permit free rotation of a pinion 1104 which is fixed to a stub shaft 1105 rotatably mounted in bearing bosses 1106, 1106 of a U-shaped frame 1107 the lower leg of such U-shaped frame having stuts 1108, 1109 converging therefrom toward shaft 129 and secured to a bearing boss 1110 in which the knotter shaft 129 is freely rotatable, said bearing boss 1110 being provided with bearing sections at each end and having a cored enlargement between such bearing sections to simplify the machining operation and to avoid the tapering effect resulting from machining a bearing the full length of boss 1110. The bearing boss 1110 and the frame 1107 thereon are maintained in proper position by spacing washers or a spacing sleeve 1110A extending between boss 1110 and one of the knotter shaft bearings 129A to maintain pinion 1104 in operative relation with gear teeth 199 and flange dwell 1102.

A transversely extending bar 1110B is fixed to the hub of the pinion gear 1104, said bar radially offset from the axis of the pinion a distance so its outer surface may engage the segmental arcuate flange 1102 so that during engagement the pinion 1104 is prevented from rotation, the bar 1110B being sufficiently short to clear the web 196 of the mutilated gear permitting rotation of the pinion 1104 when the teeth of such pinion 1104 are in engagement with the teeth 199 of the mutilated gear 186. The arcuate extent of the flange 1102 is designed for engagement with the bar 1110B at the instant the teeth of the pinion 1104 become disengaged from the last tooth of the mutilated gear, the arrangement being such that the flange dwell 1102 terminates at the instant that pinion gear 1104 is contacted by the leading tooth of the mutilated gear 186. The pinion 1104 has, as shown, ten teeth and the mutilated gear has twenty-nine teeth which results in three complete rotations of the pinion gear for each cycle, the thirtieth tooth being omitted to allow the correct operation.

Projecting upwardly and forwardly from the base plate 141 are a pair of braces 1111, 1111 which are welded at their lower ends to the base plate and welded at their upper ends to a vertical plate 1112 on which vertical plate a plurality of bearing bosses 1113, 1113 and 1114, 1114 are fixedly secured to provide bearings for twister shafts 1115, 1115. These twister shafts correspond to and are equivalent to the shafts shown in FIGURES 8–11. Sprockets 1116, 1116 are fixedly secured to the upper ends of shafts 1115, 1115 by means of set screws or the like, the hubs of such sprockets engaging bearing bosses 1113, 1113 respectively to prevent downward end play, collars 1117, 1117 being fixed to the twister shaft below bearing bosses 1114, 1114 respectively to prevent upward end play of the twister shafts. Twister hooks 1118, 1118 having diametrically slotted bosses 1119 and 1119 are fixed to the lower ends of the shafts 1115, 1115 and as shown in FIGURE 28 are prevented from relative rotation on said shafts by a tongue 1120 on the lower end of each shaft cooperating with and extending into the slot of the hub of the twister hook 1118, the hub being secured to the twister shaft by a countersunk screw axially threaded into the lower end of the shaft. A comparison between FIGURES 2 and 18 shows the similarity of construction in the embodiments of this invention in this regard.

A sprocket 1121 is fixed to the upper end of pinion gear shaft 1105 and a chain 1122 passes around the sprocket 1121 and the sprockets 1116, 1116 on twister shafts for driving the latter shafts such chain being maintained in taut condition by means of a threaded rod 1123 extending through an aperture in the vertical plate 1112 and secured thereto by locking nuts 1124, one nut being located on each side of the plate, said threaded rod 1123 passing through a laterally extending lug 1125 in the pinion supporting frame 1107 and being secured in adjusted position by means of lock nuts 1124 which also provide for obtaining the proper degree of tension or slackness in the chain 1122 to assure positive operation without excessive strain on the chain. The sprocket 1121 has 25 teeth and each sprocket 1116 has 15 teeth.

To prevent the exposed chain 1122 from being a hazard to workmen, an angle bracket 1125A (FIGURES 17 and 18) is fixed by one of its legs to the vertical plate 1112 and the horizontally extending leg is provided with two or more tapped holes 1125B, and upon this bracket a triangularly shaped housing 1125C (FIGURE 16) is secured by means of bolts 1125D, which are threaded into the tapped holes. The housing 1125C is of sufficient size to completely overlie the sprockets 1116, 1116 and 1121 and the chain carried thereby, and such housing includes a downwardly extending peripheral flange 1125E which extends well below the chain to prevent any possibility of a workman coming in contact with the chain. Of course, such housing may equally well be used in both embodiments.

The follower roller 179 on disc 178 of the actuating shaft is arranged approximately 5° ahead of the dead center position between follower rollers 182 and 183 on the disc 181 of the actuating shaft 177. This arrangement is particularly advantageous in avoiding or reducing the force required for oscillating shuttle bar 169 since any strain on the grippers 154 will react on the bar 169, tending to additionally provide a starting force to assist the follower 179 in moving the shuttle bar 169 and the movable grippers 154 which are operated thereby.

To the bearing bosses 1114, 1114 wire guide rod securing bosses 1126, 1126 are fixed and wire control rods 1127, 1127 are adjustably retained in bosses 1126, 1126 by means of set screws. The lower ends of the control rods 1127, 1127 are bent inwardly toward its twister shaft and outwardly therefrom with the lower extremity slightly above the upper surface of the twister hook 1118. Although the shape of control rods 1127, 1127' can be varied over substantial limits, the particular shape and position shown has been found to be advantageous, and these control rods are a particular feature of this invention. Control rods 1127, it will be noted are the equivalent of those designated by 85 in FIGURE 4.

The height of each twister hook 1118 can be adjusted by changing the relative positions of its collar 1117, and sprockets 1116 on its twister shafts 1115 thereby providing a means for obtaining different degrees of tension in the strains securing the completed bales, as is true with either embodiment.

Directly below the wire receiving slots 144, 144 of the base plate 141 and mounted upon a transversely extending angle bar 1128, which may be fixed to the bale forming chamber 125 or to brackets 143, 143, are a pair of fork shaped wire guides 1129, 1129 which are fixed to the angle bar 1128 by bolts. The left tine 1130 of each guide has a relatively sharply bevelled inner surface 1131, which merges into the shank of its tine to provide a rounded wire engaging surface. The right tine 1132 is provided with an outwardly and forwardly flaring surface 1133, to provide for effectively guiding the wire between the tines 1132 and 1130 and against a hardened guide pin 1134, which is secured to the tines by means of set screws 1135, whereby the guide pins may be replaced as they become worn. The provision of wire guides 1129, as well as wire guides 91, is an important feature of this invention, and it should be understood that the particular construction shown, although preferred, may be modified.

The angle bar 1128 has a notch 1136 cut through its lower flange and into the vertical flange which notch is in alignment with the space between the tines of the forked guides 1129 and with a registering notch 1137 in the wire guide 1129 to accommodate the wire extending around and over the top of the bale.

Wire 1138, 1138 is supplied to each of the needles from a continuous source of supply adjacent the front of the baler each wire being supplied through its guide tube 1139 which is supported by an arm 1140 (FIGURES 18 and 33) connected to a U-shaped guide 1141 in which a guiding cylindrical disc 1142 is mounted and secured by means of a bolt 1143 passing through the legs of the U-shaped guide 1141, the bolt 1143 also passing through an aperture in the arm 1140 and the bolt being drawn securely by a nut 1144 which fixes the guiding cylindrical disc 1142 in fixed position.

Each U-shaped guide 1141 is fixed to the bottom 1145 of the baling chamber 125 by means of round headed bolts 1146 with each U-shaped guide 1141 being in registry with its needle and wire receiving slot 137 in the bottom 1145 of the baling chamber. From the U-shaped guide 1141 and disk 1142, the wire 1138 extends rearwardly to a pin guide 1148 underlying and engaging the bottom 1145 and straddling each slot 137, the pins 1148 being secured in position by an angle bar 1149 extending across the bottom 1145 of the baler and mounted in fixed position by round headed bolts 1150, 1150, a cutout 1151 being provided in the forward flange of the angle bar 1149 for receiving the wire section 1149A shown in dash dot dot lines in FIGURE 18.

*Operation*

Figure 16:
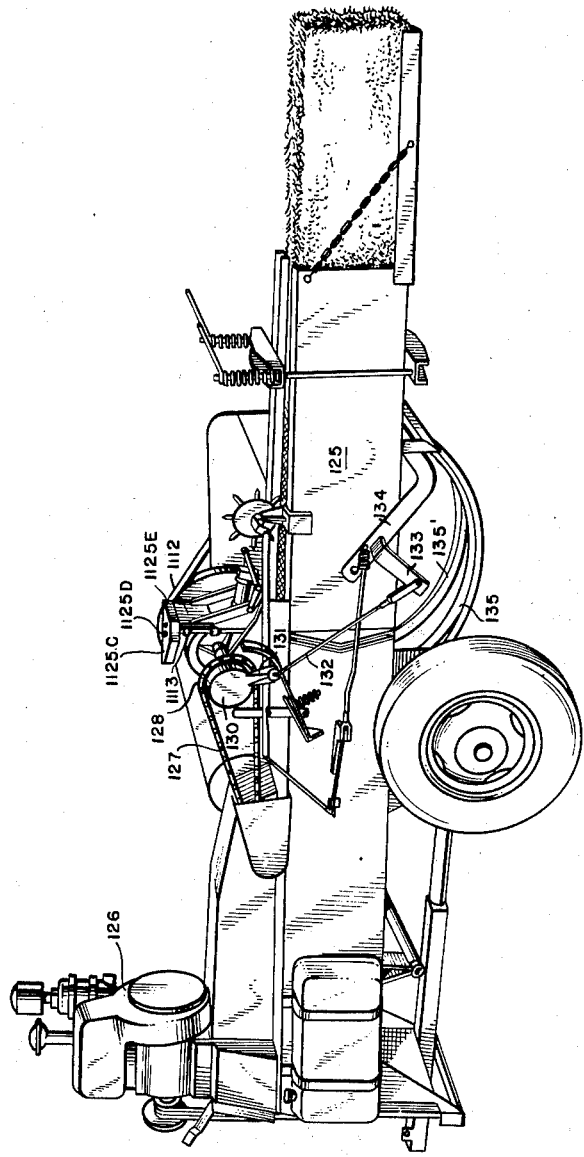
FIGURE 16 is a perspective of a conventional hay baler with the wire twisting attachment of another embodiment of the present invention applied thereto.
Figure 17:
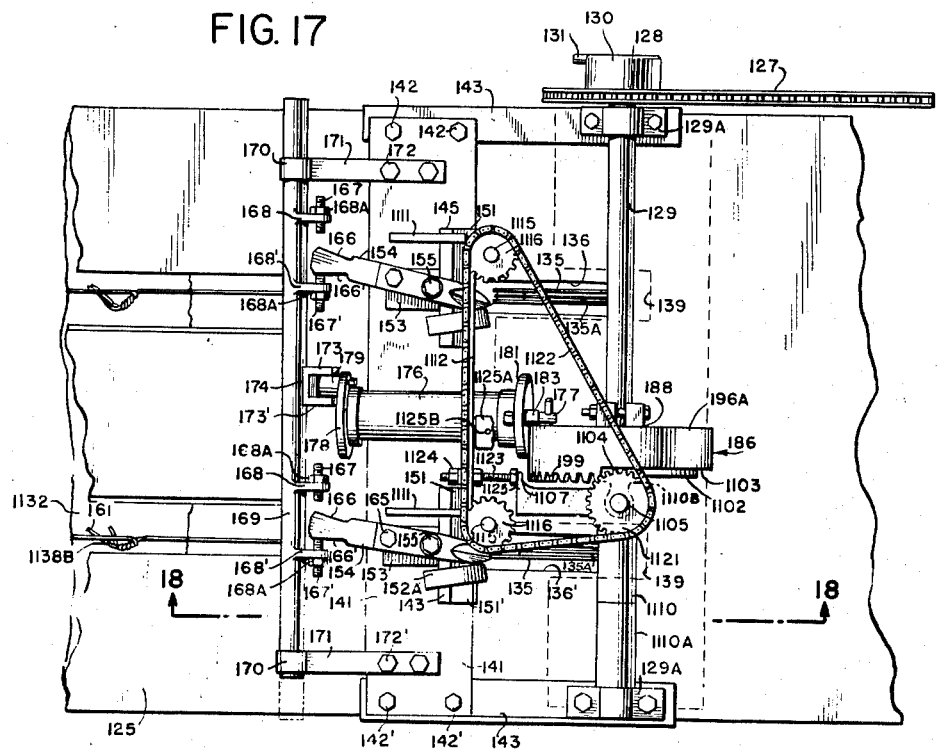
FIGURE 17 is a top plan view with parts removed of the wire twisting and clamping attachment of the embodiment of FIGURE 16 showing the cam operation of the grippers and the timed operation of the wire twisting shafts at the instant just before the twister shafts are rotated.

Assuming that a completed bale of hay 1152 has been moved forwardly by the bale of hay 140 being formed, the needles 135, 135 are in their lowermost positions shown in FIGURE 16, and as shown in the dash dot dot line position in FIGURE 18, each wire end 161 extends from its guide pin 1148 under the bale 140 across the front of the bale, and over the top of such bale to its grip-fork guide 1129 and upwardly therefrom to its movable gripper 154 and one of its associated stationary gripper tongues 150 or 150′ and cooperating clamping plate 151 or 151′, the stationary gripper being the ones in use in FIGS. 17, 18 and 22. The needles 135, 135 are then operated by the cranks 131, 131, pitmans 132 and arms 133 while knotter shaft 129 is rotated. The mutilated gear 186 rotates over the minor untoothed segment 1103 until the needles assume the full line position shown in FIGURES 17 and 18 at which time the first tooth 199 of the major or toothed segment of the mutilated gear 186 engages the pinion 1104 thereby initiating rotation of such pinion 1104 and through sprockets 1121, 1116, 1116 and chain 1122 causes the twister shafts 1115, 1115 to rotate with twister hooks 1118, 1118. Further rotation of shaft 129 causes the needles 135, 135 to reach their maximum extended position shown in dash dot lines in FIGURE 18 and shown in full lines in FIGURES 27 and 28, the twister hooks 1118, 1118 having rotated approximately ¾ of a revolution from their home or inoperative position shown in FIGURES 18, 25, 26 and 31, 32. The home position corresponds to the six o'clock position as the hooks 1118 are viewed from above while the observer faces the front of the machine. Further rotation causes the needles to withdraw to the position shown in FIGURES 29 and 30 in which each needle 135 has been retracted from its wire bight position 1138A illustrated in FIGURES 27 and 28 thereby permitting some slack in the bight portion 1138A of the wire. The slack which occurs in the bight portion 1138A of the wire is an accentuation of the slack produced by the needle movement, in the embodiment of FIGURES 1–15. When the slack is produced each movable member 154 has moved from the position shown in FIGURES 17, 22 and 25 to 28 where each tongue 150′ cooperates with the side 156′ of its movable gripper 154 to the position shown in FIGURES 29 and 30, where each tongue 150 is about to cooperate with the side 156 of its movable gripper 154 at which time each wire end 161 is released from engagement with its tongue 150′, the associated twister hook 1118 having previously engaged its associated wire end 161, and the wire section 1138B from the needle and below its associated gripper 154 as shown in FIGURES 29 and 30, so that each hook maintains its wires 161 and 1138 in control. Each wire end 161 has been released from gripper 154 and tongue 150′ and each wire 1138 is about to be cut between sections 1138A and 1138B by its movable gripper 154 cooperating with its cutting edge 147 on its associated ledger blade 145. Further movement of gripper 154 toward cutting edge 147 results in complete release of both wire ends 1138B and 161 of each wire around the bale 140 but each hook 1118 retains its wire ends assisted by its control rod 1127 so that the wire ends 1138B and 161 are positively twisted together upon continued rotation of its twister hook 1118 until five turns of the shaft 1115 have been completed, which produces corresponding twists in the wire ends after which the baling plunger 138 is withdrawn from the following end of bale 140 and the formation of the next bale is begun. The bale 140 which has just been completed expands due to the resiliency of the compressed hay as soon as plunger 138 moves forwardly, which occurs after the wire ends 161 and 1138B are secured together, the slack formed by the triangular space between the bale 140 and the wire ends 161 and 1138B (FIGURE 28) is taken up by the expanding bale. The size of this triangular space can be controlled by the vertical position of the twister hook 1118 with relation to the bale 140 by suitable adjustment of its shaft 1118 which is obtained by positioning its associated collar 1117 and sprocket 1116 for elevating the hook for a looser bale or lowering the hook for a tighter bale. This adjustment is normally fixed at the factory. As is apparent from FIGURE 17, the sprocket 1121 is of larger diameter than sprocket 1116 such that three revolutions of pinion gear 1104 results in five revolutions of sprockets 1116.

In FIGURES 31 and 32, each needle 135 has been withdrawn and the wire ends for the bale 140 have been completely twisted together and the next bale is about to be formed, the wire bight portion 1138A held by the movable gripper 154 and the stationary gripper 150 extends from the supply through guide tube 1139, U-shaped guide 1141 thence to be contacted by the hay of the next bale to be formed. Thereafter the plunger 138 compresses the increments of hay against the wire 1138 extending across the bale chamber 125 forcing the wire around the front of the bale being formed until such bale has been completed corresponding to the bale 140 shown in FIGURE 18. A section of wire 1149A extends across and is engaged between guide pin 1149 and guide 1141 by its needle 135 and carried across the bale forming chamber 125 over the front end of the bale and the ends secured together.

From the above description it is believed that the operation should be clear and that proper adjustment of the gripping action between movable grippers 154 and stationary grippers 150, 151 or 150′, 151′ is obtained by suitable adjustment of studs 167, 167′ to produce the desired motion of the movable grippers 154, 154, such studs providing for any necessary lost motion and avoiding requirements for extreme accuracy in machining thereby rendering the machine easily constructed, installed and serviced by relatively unskilled persons. The transverse passage 157 in the movable gripper 154 is of sufficient size to cooperate with the tongues 150 or 150′ to act as a sort of punch allowing any hay or other material to pass into and through the passage 157 thereby preventing any possibility of dangerous jamming between the movable gripper 154 and the stationary grippers 150, 151 or 150′, 151′ thereby preventing damage to the machine. The boat-shaped spacers 148 provide space between the adjacent tongues 150 or 150′ which permits any material lying on the associated ledger blade 145 to be pushed aside as the movable gripper operates from side to side the boat shaped portions serving as plows to perform this function.

As shown in FIGURE 17, the wire ends 161 and 1138B are twisted together with such wire ends being sufficiently long to avoid excessive stiffness and also that such wire ends are drawn inwardly against the bale 1152. The strain on the bale wire urging such ends 1138B and 161 into the bale thereby additionally preventing possibility of injury to persons handling such bales. It will also be noted that the twisted wire ends are spaced from the end of the bale so as not to be on a corner where such ends would be more apt to contact persons.

Installation

The present embodiment or attachment may be applied to conventional hay balers by removal of the tieing equipment of such conventional balers and positioning the mounting hub 188 and face plate 187 on the usual knotter shaft 129 with the usual key preventing relative rotation. The mutilated gear and cam 186 and the bracket assembly 1102 with pinion 1104 are also mounted on the shaft 129. The base plate 141 and the vertical plate 1112 form an assembly with the gripper structure and twisting means thereon which is mounted on suitable brackets or sills 143, 143 on the baling chamber 125 in proper operative relation so that the axis of the actuating shaft 177 will intersect the axis of the knotter shaft 129, the hub 188 and mutilated gear and cam 186 being positioned so that the cam rollers 182 and 183 on disk 181 of the actuating shaft will engage the rim 199A of the mutilated gear and cam 186 and maintain the actuating shaft 177 against rotation. Assuming that the structure has been so mounted a suitable spacing sleeve 1110A and/or spacing washer is mounted on shaft 129 to locate the bracket assembly 1107 in proper relation to the pinion gear 1104 for accurate meshing of the teeth of the pinion with the teeth 199 on the combination mutilated gear 186. The mutilated gear 186 is rotated so that the arcuate flange or dwell 1102 contacts bar 1110B on pinion gear 1104 preventing rotation of the pinion gear. The knotter shaft 129 is rotated until each needle 135 has been moved to its extreme extended position shown in FIGURES 27 and 28, such extended position being shown in dash dot lines in FIGURE 18. The shaft 129 is further rotated until the needles are withdrawn approximately one inch to the position shown in FIGURES 29 and 30. With the shaft 129 held stationary the mutilated gear 186 is rotated thereon until the actuating shaft 177 has been partially rotated by the engagement of one of the followers 182 or 183 in the follower receiving notch 1100 and the gripper 154 has been moved so that one of its edges is closely adjacent one of cutting edges 147 or 147' as shown in FIGURES 29 and 30 so that a wire between the gripper 154 and cutting edge 147 is just retained. Then the twister hooks 1118 and 1118 are rotated to the position shown in FIGURES 29 and 30, corresponding to the eleven o'clock position between the axis of the shaft 1115 and the tip of the hook 1118. With the parts in this relation the mutilated gear 186 is fixed to the hub and face plate 188, 187 by means of bolts 198 passing through slots 195 and 197. The hub 187, if not previously clamped to the shaft 129, is clamped thereto by the bolt 191 which draws up the movable legs 189 and 190 of the hub 188 thereby preventing endwise movement of the hub, the conventional key preventing relative rotation of the assembled hub and mutilated gear with relation to the knotter shaft 129. While the parts are still held in this timing position the chain 1122 is passed around the sprockets 1116, 1116 and 1121 and the ends of the chain are connected together by the usual master link. The proper tension in the chain 1122 is obtained by adjustment of the nuts 1124 on the threaded rod 1123 extending between the lug 1125 of the gear supporting frame 1107 and the vertical plate 1112.

The machine is now ready for operation by merely threading the wire 1138 through the tubular guide 1139 and through U-shaped guide 1141 between the bight portion of such guide and the guiding disc 1142 and by means of the needle 135 through the baling chamber 125, the end of the wire being gripped between the movable gripper 154 and one of the stationary grippers tongues 150 or 150' as shown in FIGURES 31 and 32 and any excess wire being cut off between the lower portion of the movable gripper 154 and the adjacent cutting edge 147 or 147' of the ledger blade 145. The ledger blade 145 and gripper 154 are made of sufficiently hard and strong metal to remain serviceable over the life of the machine.

It will be evident that the number of needles and the number of cooperating grippers and twisters can be varied as conditions require.

It will be obvious to those skilled in the art that various changes may be made in the invention without departing from the spirit and the scope thereof and therefore the invention is not limited by that which is shown in the drawings and described in the specification but only as indicated in the appended claims.

I claim:

1. A baler comprising an elongated casing having a chamber in which material is fed and compressed, a plunger reciprocating in said casing for feeding and compressing the material into a bale, a needle mounted for movement across the casing and through the path of said plunger for feeding a wire, a wire twisting and severing means including a base plate mounted above the casing at an angle converging in the direction of feed of material, a finger pivotally mounted on the upper side of said plate with its pivotal axis extending normal to said plate in line with the plane of movement of the needle, a bar mounted on said plate above said finger for sliding movement transverse to the direction of feed, lugs on said bar on each side of said finger and extending toward said plate, an adjusting screw in each lug for engaging said finger for controlling the movement of said finger upon movement of said bar, an abutment on each side of said finger fixed on said plate for retaining a wire between said finger and the corresponding abutment, said finger being provided with a groove on each side thereof and each of said abutments being provided with a cooperating tongue whereby a wire may be bent and retained on each side of said finger when the finger is moved to a position adjacent the corresponding abutment, the operative end of the needle being movable to a position above said finger so that the wire carried thereby may be clamped between said finger and one of the abutments, a wire twister having a wire engaging hook mounted for rotation on an axis disposed to one side of said finger with the wire engaging hook located below said plate so the hook passes below said abutments and said finger for engaging a wire clamped by said finger and a wire carried by said needle, a guide located below said hook and above the bale being formed for guiding the wire from said clamp to said material, and a cutter on said abutment cooperating with said finger for severing the wire between the clamped portion and the bale, and means for operating the parts in timed relation whereby a bale is formed pushing the wire around the forward end of the bale and the needle carries the wire around the rear of the bale across the path of the twister hook into the space between the unused abutment and the finger so that after the twisting is begun said finger moves to release the previously retained wire and the wire between the bale and the needle is clamped and severed.

2. An attachment for a baler comprising a pair of sills for mounting said attachment on a bale forming chamber through which material is fed and compressed into bales during its forward movement, a supporting plate extending between said sills having forward and rear edge portions, a pair of abutments arranged in spaced relation and mounted on the rear edge portion of said supporting plate, a wire gripping finger movably mounted on said plate and having wire contacting surfaces for alternate cooperation with each abutment for gripping a wire, means on said plate for moving said wire grippng finger from one abutment to the other, a shear plate mounted on the lower surface of each abutment and projecting toward the other abutment for cooperation with the wire gripping finger to sever the wire, uprights extending vertically from said sills rearwardly of said plate, a spider having a forwardly extending arm mounted on said uprights, a vertically disposed bearing mounted on said forwardly extending arm of said spider with the axis thereof adjacent to and spaced rearwardly of said abutments, a wire twisting hook having a vertical shaft mounted in said bearing, a sprocket at the upper end of said twister shaft, a stub shaft positioned rearwardly of said twister shaft and mounted on said spider for rotation about a vertical axis, a bevel gear at the lower end of said stub shaft and a sprocket at the upper end thereof, a chain for connecting said sprockets, a transversely extending shaft rotatably mounted in bearings on said sills and carrying a mutilated bevel gear for cooperation with the bevel gear on said stub shaft, drive means between said transversely extending shaft and said wire gripping finger for moving said wire gripping finger from one abutment to the other for each revolution of said transversely extending shaft.

3. An attachment for a baler comprising a pair of sills for mounting said attachment on a bale forming chamber, a supporting plate extending between said sills, a pair of abutments arranged in spaced relation mounted on said supporting plate, a wire gripping finger having wire contacting surfces movably mounted on said plate for alternate cooperation with each abutment for gripping a wire, means for moving said wire gripping finger from one abutment to the other, a shear plate mounted on each abutment and projecting into the path of movement of said finger for severing the wire, uprights extending vertically from said sills of said plate, a spider mounted on said uprights, a bearing mounted on said spider with the axis thereof adjacent to and spaced from said abutments, a wire twisting hook having a shaft mounted in said bearing, a sprocket at the other end of said twister shaft, a stub shaft spaced from said twister shaft and mounted on said spider for rotation, a bevel gear at the one end of said stub shaft and a sprocket at the other end thereof, a chain connecting said sprockets, a shaft rotatably mounted on bearings on said sills, a multilated bevel gear mounted on said last mentioned shaft for cooperation with the bevel gear on said stub shaft, drive means between said shaft mounted on said sills and said wire gripping finger for moving said wire gripping finger from one abutment to the other in timed relation with the rotation of said twister.

4. In a baler having a bale forming chamber, a supporting plate for mounting on said baler, a pair of abutments arranged in spaced relation mounted on said supporting plate, a wire gripping finger having longitudinally extending wire contacting surfaces movably mounted on said plate for alternate longitudinal cooperation with each abutment for gripping a wire in transverse relationship to the longitudinal axis of said gripping finger, means on said plate for moving said wire gripping finger from one abutment to the other, a shear plate mounted on each abutment and projecting toward the other abutment for cooperation with said finger to sever the wire, a bearing mounted on said baler with the axis thereof adjacent to and spaced from one of said abutments, a shaft having a wire twisting hook at one end and drive means at the other end of said shaft mounted in said bearing, other drive means between said shaft and said wire gripping finger including a reciprocating bar operatively engaged therewith for moving said wire gripping finger from one abutment to the other for releasing a wire end and twisting such released end with another wire end, and means for reducing the wire tension during the twisting of the ends thereof by said twister hook whereby excessive wire stress is prevented.

5. In a baler having a bale forming chamber, a supporting plate for mounting on said baler, a pair of abutments arranged in spaced relation mounted on said supporting plate, a wire gripping finger movably mounted on said plate for alternate longitudinal cooperation with each abutment for gripping a wire in transverse relationship to the longitudinal axis of said gripping finger, means on said plate for moving said wire gripping finger from one abutment to the other, a bearing mounted on said baler with the axis thereof adjacent to and spaced from said abutments, a shaft having a wire twisting hook at one end thereof, and drive means at the other end of said shaft mounted in said bearing, other drive means between said shaft and said wire gripping finger including a reciprocating bar operatively engaged therewith for moving said wire gripping finger from one abutment to the other so that the released wire ends are securely twisted together, and means for reducing the wire tension during the twisting of the ends thereof by said twister hook whereby excessive wire stress is prevented.

6. An attachment for a baler comprising sills for mounting on a baler, a supporting plate on said sills, a pair of abutments arranged in spaced relation mounted on said supporting plate, a wire gripping finger having wire contacting surfaces movably mounted on said plate for alternate longitudinal cooperation with each abutment for gripping a wire in transverse relationship to the longitudinal axis of said gripping finger, means for moving said wire gripping finger from one abutment to the other, a shear plate mounted on each abutment and projecting toward the other abutment for cooperation with said finger to sever a wire, a spider mounted on said sills, a bearing mounted on said spider with the axis thereof adjacent to and spaced from said abutments, a shaft having a wire twisting hook at one end thereof, said shaft being positioned for rotation about an axis offset from a vertical plane of symmetry passing between said opposed abutments, and a drive gear at the other end of said shaft mounted in said bearing, drive means between said shaft and said wire gripping finger including a reciprocating bar operatively engaged therewith for moving said wire gripping finger from one abutment to the other in operative timed relation for releasing and twisting wire ends together, and means for reducing the wire tension during the twisting of the ends thereof by said twister hook whereby excessive wire stress is prevented.

7. A baler comprising a structure having a bale forming chamber, a pair of abutments arranged in spaced relation mounted on said structure, a strand gripping finger movably mounted on said structure for alternate longitudinal cooperation with each abutment for gripping a strand in transverse relationship to the longitudinal axis thereof, means for moving said strand gripping finger from one abutment to the other, a shear plate mounted on each abutment and projecting toward the other abutment for cooperation with said finger to sever the strand, a bearing mounted on said structure with the axis thereof adjacent to and spaced from said abutments, strand fastening means, a shaft mounted in said bearing and carrying said strand fastening means, drive means between said shaft and said strand gripping finger for moving said strand gripping finger from one abutment to the other for gripping the strand material in transverse relationship to the longitudinal axis of said gripping finger whereby the strand ends are secured together by said fastening means, means for reducing the wire tension during the twisting of the ends thereof by said fastening means whereby excessive wire stress is prevented, and means for guiding the wire into a position to be gripped by said finger and one of said abutments in transverse relationship to the longitudinal axis of said finger.

8. In a baler having a bale forming chamber, the improvement comprising a supporting structure, a pair of abutments arranged in spaced relation and mounted on said supporting structure, a strand gripping finger movably mounted on said structure for alternate longitudinal cooperation with each abutment for gripping a strand in transverse relationship to the longitudinal axis of said gripping finger, means for moving said strand gripping finger from one abutment to the other, a bearing mounted on said structure with the axis thereof adjacent to and spaced from said abutments, strand fastening means, a shaft mounted in said bearing and carrying said strand fastening means, said shaft being positioned for rotation about an axis offset from a vertical plane of symmetry passing between said opposed abutments, drive means between said shaft and said strand gripping finger for moving said strand gripping finger from one abutment to the other in timed relation with said fastening means for gripping the strand material, and means for reducing the wire tension during the twisting of the ends thereof by said twister hook whereby excessive wire stress is prevented.

9. A wire gripping device comprising a plate, at least one finger pivotally mounted on said plate, abutments and cutters on opposite sides of said finger for cooperation with said finger for clamping a portion of wire while cutting the same, means for feeding a wire between said abutments so that the fed wire is on the opposite side of the finger cooperating with one of said abutments, and means for moving said finger into contact with said fed wire including a reciprocating bar operatively associated therewith to clamp the fed wire against an abutment in transverse relationship thereto and sever the same with said cutter to release the clamped wire, said wire feeding means being moved to relieve tension on said fed wire during the movement of said finger between said abutments to prevent stripping of the fed wire from the gripping device during the cutting operation.

10. Means for securing the ends of baling wire around a bale in which the wire is fed across a bale forming chamber in the path of the material being baled, as defined in claim 9, and further including means for guiding the wire into a position to be gripped by said finger and one of said abutments in transverse relationship to the longitudinal axis of said finger.

11. Means for securing the ends of baling wire around a bale in which the wire is fed across a bale forming chamber in the path of the material being baled, as defined in claim 9, and further including means for twisting said wire after the same has been cut wherein said twister means comprises a shaft, a twisting hook carried by said shaft, and a deflecting rod operatively carried in fixed relationship adjacent said shaft and having a lower free end operative to deflect the twisted wire end about said shaft for causing the severed ends of the wire to wrap around said shaft whereby the wire is prevented from leaving the grasp of said hook.

12. Wire tying means for a hay baler comprising a pair of sills, a timing shaft rotatably mounted on said sills, a timing gear adjustably secured to said timing shaft, a pinion supporting bracket mounted on said timing shaft, a pinion shaft rotatably mounted on said bracket, a pinion fixed on said pinion shaft and a driving sprocket fixed on said pinion shaft, a base plate mounted in spaced relation to said timing shaft and fixed to said sills, a cam mounted on said base plate and having means engaging said timing gear for operating said cam at predetermined times, a pair of fixed abutments on said base plate, a movable gripper mounted on said base plate for alternate cooperative engagement with each of said abutments, means interconnecting said gripper with said cam for intermittently moving said gripper between said abutments in timed sequence with said timing gear, a rotatable tying shaft mounted on said base plate, a sprocket fixed to said tying shaft, a chain extending from the sprocket on the said tying shaft to the sprocket on said pinion shaft.

13. The invention according to claim 12 in which the pinion is driven by a mutilated gear portion on said timing gear.

14. The invention according to claim 12 in which means are provided for adjusting the spacing of said pinion shaft sprocket and said tying shaft sprocket.

15. A wire tying means for a hay baler or the like comprising: means for gripping and severing wire ends, means including a rotatable twisting hook for twisting the severed ends, a cam arrangement for operating said gripping and severing means and said twisting means in adjusted timed relation comprising a hub for positive securement to a timing shaft, said hub having a flange with a plurality of arcuate slots, a cam having a hub for mounting on said shaft and having a plurality of slots registerable with the slots on said hub flange, bolts extending through said slots in said cam and in said hub for mounting the cam and the hub in fixed relation whereby a predetermined timing may be obtained, a cam shaft mounted for rotation about an axis perpendicular to said timing shaft, said cam shaft having a pair of rollers eccentrically mounted on opposite sides of the cam shaft axis for fixing the cam shaft against rotation, said cam shaft having a pin projecting transversely of the plane of said rollers for engagement with a movable lug carried by said cam to start initial rotation of said cam shaft.

16. A wire tying means for a hay baler or the like comprising: means for gripping and severing wire ends, means including a rotatable twisting hook for twisting the severed wire ends, a cam arrangement for operating said gripping and severing means and said twisting means in adjusted timed relation comprising a hub for positive securement to a timing shaft, said hub having a flange with a plurality of arcuate slots, a cam having a hub for mounting on said shaft and having a plurality of slots registerable with the slots on said hub flange, bolts extending through said slots in said cam and in said hub for mounting the cam and the hub in fixed relation whereby a predetermined timing may be obtained, a cam shaft mounted for rotation about an axis perpendicular to said timing shaft, said cam shaft having a pair of rollers eccentrically mounted on opposite sides of the cam shaft axis for fixing the cam shaft against rotation, said cam shaft having a pin projecting transversely of the plane of said rollers for engagement with a movable lug carried by said cam to start initial rotation of said cam shaft, a driven follower on said cam shaft arranged in offset relation relative to the dead center position between said pair of rollers when the latter are in inoperative position whereby the driven cam follower may operate a cooperating member with a minimum of shock.

17. A wire tying means for a hay baler comprising: means for gripping and severing wire ends, including a clamping member, means including a rotatable twisting hook for twisting the severed wire ends, a cam arrangement for operating said gripping and severing means and said twisting means in adjusted timed relation comprising a hub for positive securement to a timing shaft, said hub having a flange with a plurality of arcuate slots, a cam having a hub for mounting on said shaft and having a plurality of slots registerable with the slots on said hub flange, bolts extending through said slots in said cam and in said hub for mounting the cam and the hub in fixed relation whereby a predetermined timing may be obtained, a cam shaft mounted for rotation about an axis perpendicular to said timing shaft, said cam shaft having a pair of rollers eccentrically mounted on opposite side of the cam shaft axis for fixing the cam shaft against rotation, said cam shaft having a pin projecting transversely of the plane of said rollers for engagement with a movable lug carried by said cam to start initial rotation of said cam shaft, a driven follower on said cam shaft arranged in offset relation relative to the dead center position between said pair of rollers when the latter are in inoperative position whereby the driven cam follower may operate a cooperating member with a minimum of shock, an oscillating member, means connecting said driven follower to said oscillating member whereby said oscillating member may operate said clamping member.

18. A wire tying means for a hay baler or the like comprising: means for gripping and severing wire ends, means including a rotatable twisting hook for twisting the severed wire ends, a timing gear for operating said gripping and severing means and said twisting means including a hub, a face plate fixed on said hub, means to mount said hub in fixed relation on a shaft, a cam, means to secure said timing gear and cam to said face plate in angular relation thereto whereby 360° of adjustment is provided, said timing gear having fixed cam surfaces and gear teeth arranged in a definite relation for obtaining selected predetermined timing arrangement for a cycle of operation of said gripping and severing means and said twisting means.

19. Wire working apparatus for hay balers and the like, comprising: a pivotally mounted wire gripping finger, means positioned adjacent said gripping finger for twisting wire, means to move said gripping finger comprising a cam shaft, a pair of rollers rotatably mounted on said cam shaft in diametrically opposed relation, a cam mounted on an operating shaft and having its cam surface engageable with the periphery of said rollers for restraining rotation of said cam shaft, said cam on said operating shaft having a roller-receiving notch for engaging one of said rollers and to permit said cam shaft to make a half revolution, a third roller mounted on said cam shaft, an oscillatable element mounted for oscillating movement adjacent said third roller and means to connect said third roller to said oscillatable element whereby rotation of said cam shaft will cause said oscillatable element to change its position, said third roller being located at the opposite end of said cam shaft from said pair of rollers and disposed approximately midway between the first mentioned pair of rollers.

20. Wire working apparatus for hay balers and the like comprising: a wire gripping finger, means positioned adjacent said gripping finger for twisting wire, means to operate an oscillating element to drive said gripping finger comprising a cam shaft, a pair of rollers rotatably mounted on said cam shaft in diametrically opposed relation, a cam mounted on an operating shaft and having its cam surface engageable with the periphery of said rollers for restraining rotation of said cam shaft, said cam on said operating shaft having a roller-receiving notch for engaging one of said rollers and to permit said cam shaft to rotate a predetermined amount, an element mounted on said cam shaft, an oscillatable member mounted for oscillating movement adjacent said element and means to connect said element to said oscillatable member whereby rotation of said cam shaft will cause said oscillatable element to change its position, said element being located at the opposite end of said cam shaft from said pair of rollers and disposed approximately midway between said pair of rollers.

21. Apparatus for tying wire ends and the like comprising: wire gripping and severing means including an oscillatable element, means for twisting the wire ends, means to operate said oscillatable element to drive said oscillatable element over a small period of a complete cycle of operation comprising a cam shaft, a pair of rollers mounted on said cam shaft, a cam having a long dwell engageable with said rollers for interrupting the rotary movement of said cam shaft, said operating cam having a notch for the reception of one of said rollers to permit said cam shaft to make a half revolution.

22. Apparatus for tying wire ends and the like comprising: wire gripping and severing means including an oscillatable element, means for twisting the wire ends, means to operate said oscillatable element to drive said oscillatable element over a small period of a complete cycle of operation comprising a cam shaft, a pair of rollers mounted on said cam shaft, a cam having a long dwell engageable with said rollers for interrupting the rotary movement of said cam shaft, said operating cam having a notch for the reception of one of said rollers to permit said cam shaft to make a half revolution, a pin on said cam shaft projecting transversely of said rollers, a shoulder on said operating cam for engaging said pin to initiate rotation of said cam shaft and urge one of said rollers into said notch.

23. Apparatus for tying wire ends and the like comprising: wire gripping and severing means including an oscillatable element, means for twisting the wire ends, means to operate said oscillatable element to drive said oscillatable element over a small period of a complete cycle of operation comprising a cam shaft, a pair of rollers mounted on said cam shaft, a cam having a long dwell engageable with said rollers for interrupting the rotary movement of said cam shaft, said operating cam having a notch for the reception of one of said rollers to permit said cam shaft to make a half revolution, a pin on said cam shaft projecting transversely of said rollers, a shoulder on said operating cam for engaging said pin to initiate rotation of said cam shaft and urge one of said rollers into said notch, a third roller mounted on said cam shaft in eccentric relation to the axis of said cam shaft, a cross head engageable with said roller for movement thereby, a bar mounted for reciprocation and carrying said cross head whereby rotation of said cam shaft produces oscillation of said bar.

24. Apparatus for tying wire ends and the like comprising: wire gripping and severing means including an oscillatable element, means for twisting the wire ends, means to operate said oscillatable element to drive said oscillatable element over a small period of a complete cycle of operation comprising a cam shaft, a pair of rollers mounted on said cam shaft, a cam having a long dwell engageable with said rollers for interrupting the rotary movement of said cam shaft, said operating cam having a notch for the reception of one of said rollers to permit said cam shaft to make a half revolution, a pin on said cam shaft projecting transversely of said rollers, a shoulder on said operating cam for engaging said pin to initiate rotation of said cam shaft and urge one of said rollers into said notch, a third roller mounted on said cam shaft in eccentric relation to the axis of said cam shaft, a cross head engageable with said roller for movement thereby, a bar mounted for reciprocation and carrying said cross head whereby rotation of said cam shaft produces oscillation of said bar, a base plate, means to mount said cam shaft and bar on said base plate, said oscillatable element mounted on said base plate and having a portion adjacent said bar, adjustable abutments on said bar engageable with said oscillatable element whereby reciprocation of said bar will cause limited oscillation of said oscillatable element.

25. Apparatus for tying wire ends and the like comprising: wire gripping and severing means including an oscillatable element, means for twisting the wire ends, means to operate said oscillatable element to drive said oscillatable element over a small period of a complete cycle of operation comprising a cam shaft, a pair of rollers mounted on said cam shaft, a cam having a long dwell engageable with said rollers for interrupting the rotary movement of said cam shaft, said operating cam having a notch for the reception of one of said rollers to permit said cam shaft to make a half revolution, a pin on said cam shaft projecting transversely of said rollers, a shoulder on said operating cam for engaging said pin to initiate rotation of said cam shaft and urge one of said rollers into said notch, a third roller mounted on said cam shaft in eccentric relation to the axis of said cam shaft, a cross head engageable with said roller for movement thereby, a bar mounted for reciprocation and carrying said cross head whereby rotation of said cam shaft produces reciprocation of said bar, a base plate, means to mount said cam shaft and bar on said base plate, said oscillatable element mounted on said base plate and having a portion adjacent said bar, adjustable abutments on said bar engageable with said oscillatable element whereby reciprocation of said bar will cause limited oscillation of said oscillatable element, said oscillatable element having a gripping surface, at least one stationary gripper mounted on said base plate for cooperation with the gripping surface of said oscillatable element.

26. A baler comprising a casing in which material is fed and compressed; a plunger reciprocating in said casing for feeding and compressing the material; a needle having a wire carrying end mounted for movement across the casing from one side thereof to the opposite side; a first wire guide mounted on one side of said casing for guiding wire engaged by said needle comprising a U-shaped bracket, a guide disc mounted in said bracket, and a guide tube mounted in tangential relation to said disc, and means to support said guide tube from the diverging end of said U-shaped bracket; a second wire guide mounted on the opposite side of said casing for guiding wire in the path of material being fed and compressed comprising a shank, a pair of arms of different lengths projecting therefrom, a removably mounted pin extending between said arms, said arms having beveled free ends for guiding therebetween, and means for securing said shank to said casing; a wire gripping and severing means including a base plate on said opposite side of said casing angularly converging in the direction of feed, a finger pivotally mounted on said plate, a bar carrying a crosshead mounted on said plate for reciprocating movement transverse to the direction of feed into said casing, lugs on said bar cooperating with opposite sides of said finger, an abutment on each side of said finger and fixed to said plate for retaining a wire between said finger and the corresponding abutment, said finger being provided with a groove on each side thereof, a cooperating tongue on each of said abutments, whereby a wire may be retained on each side of said finger when the finger is moved to a position adjacent the corresponding abutment, said finger and said abutments being disposed in the path of said needle whereby the wire carrying end of the needle is movable to a position above said finger so that the wire carried by said needle may be clamped between said finger and one of the said abutments; a third wire guide mounted on one of said abutments adjacent said finger for controlling wire feed above said finger by said needle, comprising a C-shaped strap, means for securing said strap to said abutment; a twister comprising a twisting shaft and a wire engaging hook carried at one end thereof, said twister shaft being mounted for rotation on a vertical axis to one side of said finger, said wire engaging hook being disposed to engage a wire clamped between said finger and one of said abutments and passing to said second wire guide and a wire extending from said needle, and a cutter on said abutment cooperating on said finger for severing wire between the clamp portion thereof and the bale; and means for operating the parts in timed relationship whereby the material moved by said plunger pushes the wire extending from said second wire guide around the forward end of the material, then the needle carries the wire guide across the rear end of the material into the path of the twister shaft and hook, and into the space between the unused abutment and the finger, then the twister is rotated to twist the wire extending from said second wire guide and the wire carried by said needle together, and after the twisting is begun said finger moves to release the previously held end of the wire, and the wire between the bale and the needle is clamped and severed, comprising a cam arrangement including a timing shaft mounted substantially parallel to the opposite side of said casing, a hub positively secured to said timing shaft, said hub having a flange with a plurality of arcuate slots, a cam mounted on said timing shaft, said cam having a plurality of slots registerable with the slots on said hub flange, said cam having a peripheral ring with one edge thereof having an upper receiving notch therein and the other edge carrying a mutilated gear partially around said ring on either side of said upper receiving notch, bolts extending through said slots and said cam and the flange in said hub for mounting the cam to the hub in fixed relation to said timing shaft, a cam shaft mounted for rotation about an axis perpendicular to said timing shaft, a pair of rollers mounted on opposite sides of the cam shaft and cooperating with said one edge of said ring for fixing the cam shaft against rotation during most of the timing cycle, a pin projecting from said cam shaft, a lug projecting therefrom, said pin and said lug cooperating to start rotation of said cam shaft as one of said rollers approaches entry within said upper receiving notch for rotation of said cam shaft through 180°, a driven upper roller on said cam shaft cooperating with said crosshead on said bar, a bevel gear mounted to cooperate with said multilated gear, a sprocket shaft carrying said bevel gear and a sprocket, a chain cooperating with said sprocket on said sprocket shaft and a sprocket carried by said twister shaft for rotating said twister shaft through a plurality of revolutions when said multilated gear drives said bevel gear.

27. A baler comprising an elongated casing in which material is fed and compressed; a plunger reciprocating in said casing for feeding and compressing the material; a needle having a wire carrying end mounted for movement across the casing and through the path of the plunger for feeding a wire across said casing from one side thereof to the opposite side; first wire guide means mounted on one side of said casing for maintaining effective control over the strand; second wire guide means mounted on said opposite side of said casing for guiding wire into the path of the material being fed; a wire gripping and severing means including a base plate on said opposite side of said casing disposed at an angle converging in the direction of feed of material, a finger pivotally mounted on said plate, said finger having its pivotal axis extending normal to said plate in line with the plane of movement of the needle, a bar carrying a crosshead mounted on said plate for reciprocating movement transverse to the direction of feed of material into said casing, lugs on said bar cooperating with opposite sides of said finger, an adjusting screw in each lug for engaging said finger for pivotal movement of said finger upon reciprocating movement of said bar, an abutment on each side of said finger cooperating with said finger and fixed on said plate for retaining a wire between said finger and the corresponding abutment, said finger being provided with a groove on each side thereof and each of said abutments being provided with a cooperating tongue whereby a wire may be bent and retained on each side of said finger when the finger is moved to a position adjacent the corresponding abutment, said finger and said abutments being disposed in the path of said needle whereby the wire carrying end of the needle is movable to a position above said finger so that the wire carried by said needle may be clamped between said finger and one of the abutments; a third wire guide means mounted on one end of said abutments adjacent said finger for controlling wire fed above said finger by said needle; a twisting shaft and a wire engaging hook carried at one end thereof, said twister shaft being mounted for rotation on a vertical axis to one side of said finger, and said wire engaging hook being disposed below said plate, and said finger for engaging a wire clamped between said finger and one of said abutments and passing to said second wire guide and a wire extending from said needle, and a cutter on said abutment cooperating with said finger for severing wire between the clamped portion thereof and the bale; means for operating the parts in timed relation whereby said plunger moves into said chamber, the material moved by said plunger pushes the wire extending from said second wire guide means around the forward end of the material, then the needle carries a wire across the rear end of the material into the path of the twister shaft and hook and into the space between the unused abutment and the finger, then said twister shaft and wire engaging hook carried at one end thereof is rotated to twist the wire extending from said second wire guide means and the wire carried by said needle together, and after the twisting is begun said finger moves to release the previously held end of the wire, and the wire between the bale and needle is clamped and severed.

28. The apparatus as defined in claim 27 said first wire guide means including a U-shaped bracket having flanges extending outwardly therefrom in diverging relation to the bight portion of said bracket, a guide disc mounted in said bracket and cooperable with the bight portion thereof to guide a strand of wire whereby the strand will be frictionally urged against said guide disc and said bracket for maintaining effective control thereover, a guide tube in tangential relation to said disc for guiding strand material thereto, and means to support said guide tube from the diverging end of said U-shaped bracket.

29. The apparatus as defined in claim 28; said second wire guide means including a shank, a pair of arms projecting from said shank and forming a fork, a pin removably in said arms and extending therebetween, said arms having beveled free ends for guiding a wire between said arms into engagement with said pin, one of said arms being of less length than the other, and means for securing said shank to said casing.

30. The apparatus as defined in claim 29; said third wire guide means including a strap formed into a C-shape by bending and having an aperture in one end thereof, and bolt means cooperating with said aperture for securing said strap in said abutment.

31. The apparatus as defined in claim 30; said means for operating the parts in timed relationship including a cam arrangement including a timing shaft mounted in parallel relation to said opposite side of said casing, a hub positively secured to said timing shaft, said hub having a flange with a plurality of arcuate slots, a cam mounted on said timing shaft, said cam having a plurality of slots registrable with the slots on said hub flange, said cam having a peripheral ring with one edge thereof having a follower receiving notch therein and the other edge carrying a mutilated gear extending partially around said ring on either side of said follower receiving notch, bolts extending through said slots in said cam and the flange in said hub for mounting the cam to the hub in fixed relation to said timing shaft whereby a predetermined timing cycle may be obtained, a cam shaft mounted for rotation about an axis perpendicular to said timing shaft, said cam shaft having a pair of rollers eccentrically mounted on opposite sides of the cam shaft axis and cooperating with said one edge of said ring for fixing the cam shaft against rotation during most of the timing cycle, said cam shaft having a pin projecting therefrom, said cam having a lug projecting therefrom, said pin and said lug cooperating to start rotation of said cam shaft as one of said rollers approaches entry within said follower receiving notch in said ring for rotation of said cam shaft through 180°, a driven follower roller on said cam shaft cooperating with said crosshead on said bar, said follower roller being positioned ahead of the dead center position between said pair of rollers whereby the driven cam follower operates said bar with a minimum of shock, a bevel gear mounted to cooperate with said mutilated gear on said one edge of said ring, a sprocket shaft carrying said bevel gear and a sprocket, a chain cooperating with said sprocket on said sprocket shaft and a sprocket carried by said twister shaft for rotating said twister shaft through a plurality of revolutions when said mutilated gear drives said bevel gear.

32. A method of separately tying a succession of compressed bales during formation thereof with wire-like material comprising: advancing each bale during formation thereof in succession along a path; sequentially positioning a continuous length of wire-like material across the bale path to transversely engage each bale in succession during formation thereof; encircling the formed bale to be tied with the continuous length of wire-like material while simultaneously feeding a succeeding length thereof transversely across the path to be traversed by a succeeding bale during formation thereof; relaxing tension on the encircling wire-like material prior to severance thereof; partially tying the encircling wire-like material prior to severance thereof by twisting the same; severing the encircling wire-like material from the continuous length thereof; completing the tying of the severed encircling wire-like material; and retaining the continuous length of wire-like material in position to subsequently encircle a succeeding bale during formation thereof.

References Cited by the Examiner

UNITED STATES PATENTS 1,512,532   10/24   Grieves _____ 100—22

FOREIGN PATENTS 314,460   9/19   Germany.

WALTER A. SCHEEL, *Primary Examiner.*